United States Patent
Kokotov et al.

(10) Patent No.: US 11,633,677 B2
(45) Date of Patent: Apr. 25, 2023

(54) STATIC COALESCER, SYSTEM AND METHOD THEREFOR

(71) Applicant: TURBULENT TECHNOLOGIES LTD., Haifa (IL)

(72) Inventors: Yuri Kokotov, MaAle Adumim (IL); Roman Sheinman, Kfar—Saba (IL)

(73) Assignee: TURBULENT TECHNOLOGIES LTD., Haifa (IL)

(*) Notice: Subject to any disclaimer, the term of this patent is extended or adjusted under 35 U.S.C. 154(b) by 688 days.

(21) Appl. No.: 16/961,930

(22) PCT Filed: Jan. 16, 2018

(86) PCT No.: PCT/IB2018/050266
§ 371 (c)(1),
(2) Date: Jul. 14, 2020

(87) PCT Pub. No.: WO2018/131005
PCT Pub. Date: Jul. 19, 2018

(65) Prior Publication Data
US 2020/0338475 A1 Oct. 29, 2020

Related U.S. Application Data

(60) Provisional application No. 62/446,606, filed on Jan. 16, 2017.

(51) Int. Cl.
| | |
|---|---|
| *B01D 17/06* | (2006.01) |
| *B01D 17/04* | (2006.01) |
| *B01D 17/02* | (2006.01) |
| *B03C 11/00* | (2006.01) |
| *C10G 31/00* | (2006.01) |
| *C10G 31/10* | (2006.01) |
| *C10G 53/02* | (2006.01) |
| *C11B 3/16* | (2006.01) |

(52) U.S. Cl.
CPC ....... *B01D 17/045* (2013.01); *B01D 17/0217* (2013.01); *B01D 17/06* (2013.01); *B03C 11/00* (2013.01); *C10G 31/00* (2013.01); *C10G 31/10* (2013.01); *C10G 53/02* (2013.01); *C11B 3/16* (2013.01); *C10G 2300/104* (2013.01); *C10G 2300/1051* (2013.01); *C10G 2300/1055* (2013.01); *C10G 2400/02* (2013.01); *C10G 2400/04* (2013.01); *C10G 2400/08* (2013.01)

(58) Field of Classification Search
CPC ... B01D 17/045; B01D 17/0217; B01D 17/06
See application file for complete search history.

(56) References Cited

U.S. PATENT DOCUMENTS

| | | | |
|---|---|---|---|
| 4,046,698 A | 9/1977 | Pielkenrood | |
| 5,762,810 A | 6/1998 | Pelton et al. | |
| 6,164,458 A * | 12/2000 | Mandrin | B01D 17/045 |
| | | | 210/DIG. 5 |
| 2008/0237140 A1* | 10/2008 | Liverud | E21B 43/34 |
| | | | 210/151 |

FOREIGN PATENT DOCUMENTS

| | | | |
|---|---|---|---|
| DE | 3707285 A1 * | 9/1988 | |
| WO | 2010079492 A1 | 7/2010 | |
| WO | WO-2010079492 A1 * | 7/2010 | ............. B01D 17/00 |

OTHER PUBLICATIONS

PCT search opinion for PCT/IB2018/050266 dated Apr. 26, 2018.
PCT search report for PCT/IB2018/050266 dated Apr. 26, 2018.
DE3707285 Machine Translation (by Google Translate)—published Sep. 15, 1988.

* cited by examiner

*Primary Examiner* — Randy Boyer
(74) *Attorney, Agent, or Firm* — Momentum IP; Marc Van Dyke

(57) ABSTRACT

A coalescence method and related system are disclosed herein. A multiphase dispersion feed comprising first and second liquids (i.e. where droplets of the first liquid (dispersed phase) are dispersed in the second liquid (continuous phase)) is passed through a static mechanical droplet-coalescer comprising a channel characterized by a plurality of in-series segments, each segment characterized by a segment-specific-characteristic obstacle size and having geometric features disclosed herein. In embodiments of the invention, the static mechanical droplet-coalescer promotes coalescence between droplets of first liquid to form larger droplets of first liquid. Subsequently, after the dispersion exits the coalescer, the larger droplets are easier to remove from the second liquid (continuous phase) than the smaller droplets that coalesced into the larger droplets.

16 Claims, 22 Drawing Sheets

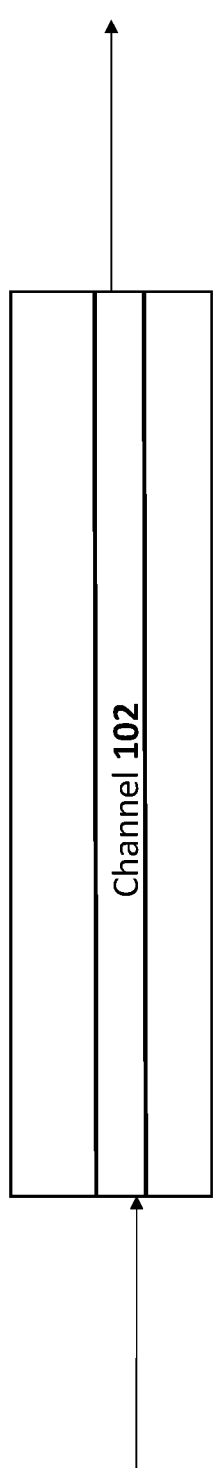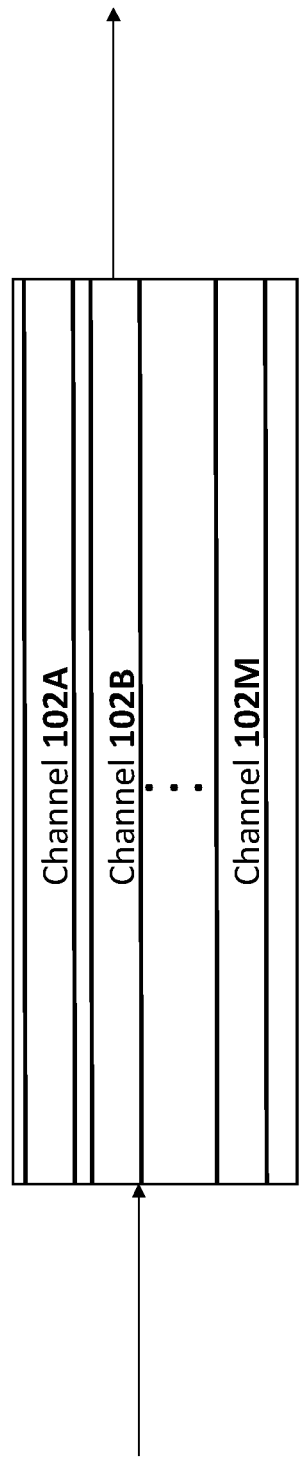
Fig. 2A
Fig. 2B

STATIC COALESCER, SYSTEM AND METHOD THEREFOR

CROSS-REFERENCE TO RELATED APPLICATIONS

This patent application claims the benefit of U.S. Provisional Patent Application No. 62/446,606 filed on Jan. 16, 2017, which is incorporated herein by reference in its entirety.

BACKGROUND

Coalescer devices are known in the art for example, see WO/2010/079492 of Turbulent Technologies and U.S. Pat. No. 5,762,810, each of which are incorporated by reference.

SUMMARY

Embodiments of the present invention relate to the processing of a multiphase dispersion feed comprising first and second liquids, where droplets of the first liquid (dispersed phase) are dispersed in the second liquid (continuous phase). The first liquid (dispersed phase) is an organic liquid and the second liquid (continuous phase) is an aqueous liquid or vice versa, depending on the application.

In particular, embodiments of the present invention relate to 'coalescer devices' which promote coalescence between droplets of first liquid to form larger droplets of first liquid. Subsequently, after the dispersion exits the coalescer, the larger droplets are easier to remove from the second liquid (continuous phase) than the smaller droplets that coalesced into the larger droplets.

Embodiments of the invention relate to a coalescence method, the method comprising: a. providing a multiphase dispersion feed comprising dispersed and continuous phases of first and second liquids, the multiphase dispersion feed comprising at least 20% v/v (by volume) first liquid; and b. subjecting the multiphase dispersion feed to a coalescence process by passing it through a static mechanical droplet-coalescer comprising a channel including a set Segment_Set $\{Seg_1, Seg_2 \ldots Seg_N\}$ of at least 10 or at least 25 or at least 50 or at least 100 or at least 500 in-series segments disposed in series with respect to each other, each given segment $Seg_i$ being characterized by a segment-specific-characteristic obstacle size $b_i$, and wherein each given segment $Seg_i$ of set Segment_Set $\{Seg_1, Seg_2 \ldots Seg_N\}$ has each of the following features: i. a ratio between a respective individual-segment length $isl(Seg_i)$ for the given segment $Seg_i$ and an respective individual segment average width $isaw(Seg_i)$ for the given segment $Seg_i$ is at least 5 or at least 10 or at least 25 or at least 50; ii. a ratio between $b_i$ and a respective individual segment average width $isaw(Seg_i)$ of the given segment $Seg_i$ is less than 1 (for example, at most 0.9 or at most 0.8 or at most 0.7) and is at least 0.05 or at least 0.1 or at least 0.2; at least 5 or at least 10 or at least 25 or at least 50 or at least 100 $b_i$-sized obstacles are disposed within the given segment $Seg_i$ to form a respective set b_Obstacle_Set$(Seg_i)$ of $b_i$-sized obstacles for the given segment $Seg_i$; iv. flow throughout at least 50% or at least 75% at least 90% or at least 95% or at least 99% or an entirety of each said given segment $Seg_i$ is sufficiently turbulent such that a segment-specific Reynold's number $\rho * IS\_V_{AVG}(Seg_i) * b_i/\mu$ is at least 2000 or at least 3000 or at least 3500 or at least 4000 or at least 4500 or at least 5000 or at least 5500 or at least 6000 where $IS\_V_{AVG}(Seg_i)$ is the respective average velocity within the given segment; v. each $b_i$-size obstacle of the set $b_i$_Obstacle_Set$(Seg_i)$ of $b_i$-sized obstacles within the given segment $Seg_i$ is distanced from its nearest neighboring $b_i$-size obstacle within the channel by at least $0.75*b_i$ and at most $2.5*b_i$; viii. a ratio $(IS\_V_{AVG}(Seg_i))^3/b_i$ between (A) a cube of the respective average velocity $IS\_V_{AVG}(Seg_i)$ within the given segment $Seg_i$ and (B) $b_i$ is between 0.75 meter$^2$/sec$^3$ and 15 meters$^2$/sec$^3$, and wherein the dispersion feed is passed through the static mechanical droplet-coalescer so that a total residence time collectively in all of the segments of Segment_Set $\{Seg_1, Seg_2 \ldots Seg_N\}$ is at least 30 seconds or at least 45 seconds or at least one minute.

In some embodiments, all of the segments of Segment_Set $\{Seg_1, Seg_2 \ldots Seg_N\}$ have a common $b_i$ value such that $b_1=b_2=\ldots=b_N$.

In some embodiments, for each given segment $Seg_i$ of Segment_Set $\{Seg_1, Seg_2 \ldots Seg_N\}$, each $b_i$-size obstacle of the set $b_i$_Obstacle_Set$(Seg_i)$ of $b_i$-sized obstacles within the given segment $Seg_i$ is upstream longitudinally-displaced from another $b_i$-size obstacle by at least $0.5*b_i$ or $0.6*b_i$ or $0.75*b_i$ or at least $0.85*b_i$ or at least $b_i$ and/or at most $3*b_i$ or at most $2.5*b_i$ or at most $2.25*b_i$ or at most $2*b_i$(for example, between $0.75*b_i$ and $2.5*b_i$).

In some embodiments, for each given segment $Seg_i$ of Segment_Set $\{Seg_1, Seg_2 \ldots Seg_N\}$, each $b_i$-size obstacle of the set $b_i$_Obstacle_Set$(Seg_i)$ of $b_i$-sized obstacles within the given segment $Seg_i$ is downstream longitudinally-displaced from another $b_i$-size obstacle by at least $0.5*b_i$ or $0.6*b_i$ or $0.75*b$, or at least $0.85*b_i$ or at least $b_i$ and/or at most $3*b_i$ or at most $2.5*b_i$ or at most $2.25*b_i$ or at most $2*b_i$ (for example, between $0.75*b_i$ and $2.5*b_i$).

In some embodiments, further comprising, after the coalescence process, passing the post-static-coalescer dispersion into a separator to obtain separate first and second output phases.

In some embodiments, the first and second output phases respectively comprise the first and second liquids and are respectively substantially free of the second and first liquids.

In some embodiments, the feed is obtained by mixing a source-dispersion with an additional dispersion.

In some embodiments, the additional dispersion is obtained from recycling an outflow of the separator, the outflow having a concentration of the first liquid that is least 20% vol, or at least 25% vol or at least 30% or at least 40%.

In some embodiments, a dispersed phase in the additional feed and a dispersed phase in the source feed are both organic but are different liquids.

In some embodiments, the source feed is a crude oil and the additional feed is a hydrotreated petroleum product and/or jet fuel and/or kerosene and/or diesel and/or gasoline.

In some embodiments, at least 10% or at least 20% or at least 30% or at least 40% or at least 50% of a feed entering the first segment is obtained from an output of the separator.

In some embodiments, a void fraction in each $Seg_i$ segments of Segment_Set $\{Seg_1, Seg_2 \ldots Seg_N\}$ is between 50% and 90%

In some embodiments, for each given segment $Seg_i$ of Segment_Set $\{Seg_1, Seg_2 \ldots Seg_N\}$, no point within the given segment $Seg_i$ is longitudinally displaced from a nearest obstacle of the respective set $b_i$_Obstacle_Set$(Seg_i)$ of $b_i$-sized obstacles by more than $3*b_i$ or by more than $2.5*b_i$ or by more than $2*b_i$ or by more than $1.5*b_i$.

In some embodiments, the coalescence process is performed so as to reduce a population of droplets having a size of less than x microns by at least 5% or at least 10% or at least 25% or at least 50% or at least 75% or at least 80%, and wherein x is selected from the group consisting of 50 microns, 40 microns, 30 microns, 25 microns, 20 microns, 15 microns and 10 microns.

In some embodiments, the coalescence process is performed to increase a population of droplets having a size of at least y by at least 1% or at least 2% or at least 3% or at least 5% or at least 10%, and wherein y is selected from the group consisting of 75 microns, 80 microns, 85 microns, 85 microns, 90 microns, 100 microns, 125 microns, 150 microns and 200 microns.

In some embodiments, an entirety of the channel is within a prism (e.g. rectangular prism) having dimensions of x,y,z and a ratio between a length of the channel and max(x,y,z) is at least 5 or at least 10 or at least 50 or least 100.

In some embodiments, a ratio between (i) an average droplet size of the second multiphase dispersion feed and (ii) the characteristic width w characterizing each of the segments is at most 1 or at most 0.5 or at most 0.25 or at most 0.1 or at most 0.05 or at most 0.01.

In some embodiments, at least a majority of the segments of Segment_Set $\{Seg_1, Seg_2 \ldots Seg_N\}$ (e.g. at least 50% of Segment_Set or at least 75% of segments of Segment_Set or 90% of segments of Segment_Set or all segments of Segment_Set) lacks sharp obstacles having a radius of curvature of at most z mm (e.g. z=6 mm or z=5 mm or z=4 mm).

In some embodiments, the second multiphase dispersion feed comprises at most 50% V/V first liquid.

In some embodiments, for each segment $Seg_i$ of Segment_Set $\{Seg_1, Seg_2 \ldots Seg_N\}$ at least some or at least a majority of the $b_i$-obstacles are attached to and/or integrally formed with a channel wall.

In some embodiments, the segment set $\{Seg_1, Seg_2 \ldots Seg_N\}$ has first and second subsets denoted as seg-First and seg-Second, such that (i) a most downstream segment in the first subset seg-First is disposed upstream of a most upstream segment in the second subset seg-Second, (ii) a minimum $b_i$ value among segments of the first subset is defined as b-FIRST; (iii) a maximum $b_i$ value among segments of the second subset is defined as b-SECOND; and (iv) a ratio between b-SECOND and b-FIRST is at least 1.25 or at least 1.5 or at least 1.75 or at least 2 or at least 3 or at least 5.

In some embodiments, the first subset seg-First has a cardinality of at least 3 or at least 5 or at least 10 or at least 15 and/or the second subset seg-Second has a cardinality of at least 3 or at least 5 or at least 10 or at least 15.

In some embodiments, the segment set $\{Seg_1, Seg_2 \ldots Seg_N\}$ has first, second and third subsets denoted as seg-First, seg-Second and seg-Third, such that (i) a most downstream segment in the first subset seg-First is disposed upstream of a most upstream segment in the second subset seg-Second, (ii) a most downstream segment in the second subset seg-Second is disposed upstream of a most upstream segment in the third subset seg-Third, (iii) a minimum $b_i$ value among segments of the first subset seg-First is defined as b-MIN-FIRST; (iv) a maximum $b_i$ value among segments of the second subset seg-Second is defined as b-MAX-SECOND; (v) a ratio between b-MIN-SECOND and b-MAX-FIRST is at least 1.25 or at least 1.5 or at least 1.75 or at least 2,(vi) a minimum $b_i$ value among segments of the second subset seg-Second is defined as b-MIN-SECOND; (iv) a maximum $b_i$ value among segments of the third subset seg-Third is defined as b-MAX-THJIRD; (v) a ratio between b-MIN-THIRD and b-MAX-SECOND is at least 1.25 or at least 1.5 or at least 1.75 or at least 2 or at least 3 or at least 5.

In some embodiments, the first subset seg-FIRST has at a cardinality of at least 3 or at least 5 or at least 10 or at least 15 and/or the second subset seg-SECOND has at a cardinality of at least 3 or at least 5 or at least 10 or at least 15 and/or the third subset seg-SECOND has at a cardinality of at least 3 or at least 5 or at least 10 or at least 15.

In some embodiments, a continuous phase or a disperse phase of the dispersion is crude oil, fuel-products (e.g. kerosene, diesel, jet-fuel, gasoline or any other hydrotreated product), vegetable oil, synthetic oil or any other organic liquid.

A coalescence system comprising: a. a static mechanical droplet-coalescer comprising a channel including a set Segment_Set $\{Seg_1, Seg_2 \ldots Seg_N\}$ of at least 10 or at least 25 or at least 50 or at least 100 or at least 500 in-series segments disposed in series with respect to each other; and b. a multiphase dispersion comprising dispersed and continuous phases of first and second liquids flowing through the static mechanical droplet-coalescer and through all segments of Segment_Set such that upon entering the first segment $Seg_1$ of set Segment_Set $\{Seg_1, Seg_2 \ldots Seg_N\}$ the multiphase dispersion comprises at least 20% v/v (by volume) first liquid, wherein each given segment $Seg_i$ is characterized by a segment-specific-characteristic obstacle size b and wherein each given segment $Seg_i$ has each of the following features: i. a ratio between a respective individual-segment length isl($Seg_i$) for the given segment $Seg_i$ and an respective individual segment average width isaw($Seg_i$) for the given segment $Seg_i$ is at least 5 or at least 10 or at least 25 or at least 50; ii. a ratio between $b_i$ and a respective individual segment average width thereof isaw($Seg_i$) for the given segment $Seg_i$ is less than 1(for example, at most 0.9 or at most 0.8 or at most 0.7)) and is at least 0.05 or at least 0.1 or at least 0.2. iii. at least 5 or at least 10 or at least 25 or at least 50 or at least 100 $b_i$-sized obstacles are disposed within every individual segment $Seg_i$ to form a respective set b_Obstacle_Set($Seg_i$) of $b_i$-sized obstacles for the given segment $Seg_i$; iv. flow throughout at least 50% or at least 75% at least 90% or at least 95% or at least 99% or an entirety of said given $Seg_i$ segment is sufficiently turbulent such that a segment-specific Reynold's number $\rho*IS\_V_{AVG}(Seg_i)*b_i/\mu$ is at least 2000 or at least 3000 or at least 3500 or at least 4000 or at least 4500 or at least 5000 or at least 5500 or at least 6000 where $IS\_V_{AVG}(Seg_i)$ is the respective average velocity within the given segment; v. each $b_i$-size obstacle of the set $b_i$_Obstacle_Set($Seg_i$) of $b_i$-sized obstacles within the given segment $Seg_i$ is distanced from its nearest neighboring $b_i$-size obstacle within the channel by at least $0.75*b_i$ and at most $2.5*b_i$;viii. a ratio $(IS\_V_{AVG}(Seg_i))^3/\ b_i$ between (A) a cube of the respective average velocity $IS\_V_{AVG}(Seg_i)$ within the given segment $Seg_i$ and (B) $b_i$ is between 0.75 meter$^2$/sec$^3$ and 15 meters$^2$/sec$^3$, and wherein the multi-phase dispersion is passed through the static mechanical droplet-coalescer so that a total residence time collectively in all of the segments of Segment_Set $\{Seg_1, Seg_2 \ldots Seg_N\}$ is at least 30 seconds or at least 45 seconds or at least one minute.

In some embodiments, the system further comprises a fluid-flow device (e.g. a pump) for forcing the multi-phase dispersion to flow through the static mechanical droplet-coalescer.

In some embodiments, the system further comprises a separator disposed downstream of the static coalescer and configured to receive outflow of the coalescer into the separator.

In some embodiments, the separator is a centrifuge assembly, or an electrostatic separator, or hydrocyclone or a settler.

A coalescence method (claim 1 of summary section) comprising: a. providing a multiphase dispersion feed comprising dispersed and continuous phases of first and second liquids, the multiphase dispersion feed comprising at least 20% v/v (by volume) first liquid; and subjecting the multiphase dispersion feed to a coalescence process by passing it through a static mechanical droplet-coalescer comprising a channel including a set Segment_Set {$Seg_1$, $Seg_2$ ... $Seg_N$} of at least 10(e.g. in some embodiments, at least 25 or at least 50 or at least 100 or at least 500) in-series segments disposed in series with respect to each other, each given segment $Seg_i$ being characterized by a segment-specific-characteristic obstacle size b and wherein each given segment $Seg_i$ of set Segment_Set {$Seg_1$, $Seg_2$ ... $Seg_N$} has each of the following features: i. a ratio between a respective individual-segment length isl($Seg_i$) for the given segment $Seg_i$ and an respective individual segment average width isaw($Seg_i$) for the given segment $Seg_i$ is at least $x_A$($x_A \geq 5$) (for example, $x_A \leq 10$ or $x_A \leq 25$ or $x_A \leq 50$); ii. a ratio between $b_i$ and a respective individual segment average width isaw ($Seg_i$) of the given segment $Seg_i$ is less than 1 (for example, at most 0.9 or at most 0.8 or at most 0.7) (for example, at least 0.05 or at least 0.1 or at least 0.2); iii. at least $x_B$($x_B \geq 5$)(for example, $x_B \geq 10$ or $x_B \geq 25$ or $x_B \geq 50$ or $x_B \geq 1.00$) $b_i$-sized obstacles are disposed within the given segment $Seg_i$ to form a respective set b_Obstacle_Set($Seg_i$) of $b_i$-sized obstacles for the given segment $Seg_i$, where a value of $x_B$ is at least 5; iv. flow throughout at least $x_C$% ($x_C \geq 50$) (for example, $x_C \geq 75$ or $x_C \geq 90$ or $x_C \geq 95$ or $x_C \geq 99$) of each said given segment $Seg_i$ is sufficiently turbulent such that a segment-specific Reynold's number $\rho * IS\_V_{AVG}$ ($Seg_i$)*$b_i$/$\mu$ is at least $x_D$($x_D \geq 2000$) (for example, $x_D \geq 3000$ or $x_D \geq 4000$ or $x_D \geq 4500$ or $x_D \geq 5000$) where $IS\_V_{AVG}$($Seg_i$) is the respective average velocity within the given segment; v. each $b_i$-size obstacle of the set b_Obstacle_Set($Seg_i$) of $b_i$-sized obstacles within the given segment $Seg_i$ is distanced from its nearest neighboring $b_i$-size obstacle within the channel by at least 0.75*$b_i$ and at most 2.5*$b_i$; viii. a ratio ($IS\_V_{AVG}$($Seg_i$))$^3$/$b_i$ between (A) a cube of the respective average velocity $IS\_V_{AVG}$($Seg_i$) within the given segment $Seg_i$ and (B) $b_i$ is between 0.75 meter$^2$/sec$^3$ and 15 meters$^2$/sec$^3$, and wherein the dispersion feed is passed through the static mechanical droplet-coalescer so that a total residence time collectively in all of the segments of Segment_Set {$Seg_1$, $Seg_2$ ... $Seg_N$} is at least $x_E$ seconds ($x_E \geq 30$) (for example, $x_E \geq 45$ or $x_E \geq 60$).

The method (claim 2 of the summary section) according to claim 1 of the summary section, wherein for all of the segments of Segment_Set {$Seg_1$, $Seg_2$ ... $Seg_N$} have a common $b_i$ value such that $b_1=b_2=...=b_N$.

The method (claim 3 of the summary section) according to any one of claims 1-2 in the summary section, wherein for each given segment $Seg_i$ of Segment_Set {$Seg_1$, $Seg_2$ ... $Seg_N$}, each $b_i$-size obstacle of the set b_Obstacle_Set($Seg_i$) of $b_i$-sized obstacles within the given segment $Seg_i$ is upstream longitudinally-displaced from another $b_i$-size obstacle by at least $x_F$*$b_i$($x_F \geq 0.5$) and/or at most $x_G$*$b_i$ ($x_G \leq 3$).

The method (claim 4 of summary section) according to any one of claims 1-3 in the summary section, wherein for each given segment $Seg_i$ of Segment_Set {$Seg_1$, $Seg_2$ ... $Seg_N$}, each $b_i$-size obstacle of the set b_Obstacle_Set($Seg_i$) of $b_i$-sized obstacles within the given segment $Seg_i$ is downstream longitudinally-displaced from another $b_i$-size obstacle by at least $x_H$*$b_i$($x_H \geq 115$) and/or at most $x_i$*$b_i$ ($x_i \geq 3$).

The method (claim 5 of summary section) according to any one of claims 1-4 in the summary section, further comprising, after the coalescence process, passing the post-static-coalescer dispersion into a separator to obtain separate first and second output phases.

The method (claim 6 of summary section) according to any one of claims 1-5 in the summary section, wherein the first and second output phases respectively comprise the first and second liquids and are respectively substantially free of the second and first liquids.

The method (claim 7 of summary section) according to any one of claims 1-6 in the summary section, wherein the feed is obtained by mixing a source-dispersion with an additional dispersion.

The method (claim 8 of summary section) of claim 7 of summary section wherein the additional dispersion is obtained from recycling an outflow of the separator, the outflow having a concentration of the first liquid that is at least $x_1$% vol ($x_i \geq 20$).

The method (claim 9 of summary section) according to any one of claims 1-8 in the summary section, wherein a dispersed phase in the additional feed and a dispersed phase in the source feed are both organic but are different liquids.

The method (claim 10 of summary section) according to claim 9 of summary section, wherein the source feed is a crude oil and the additional feed is a hydrotreated petroleum product and/or jet fuel and/or kerosene and/or diesel and/or gasoline.

The method (claim 11 of summary section) according to any one of claims 1-10 in the summary section, wherein at least $x_K$% ($x_K \geq 1.0$) of a feed entering the first segment is obtained from an output of the separator.

The method (claim 12 of summary section) according to any one of claims 1-11 in the summary section, wherein a void fraction in each $Seg_i$ segments of Segment_Set {$Seg_1$, $Seg_2$ ... $Seg_N$} is between 50% and 90%.

The method (claim 13 of summary section) according to any one of claims 1-12 in the summary section, wherein for each given segment $Seg_i$ of Segment_Set {$Seg_1$, $Seg_2$ ... $Seg_N$}, no point within the given segment $Seg_i$ is longitudinally displaced from a nearest obstacle of the respective set b_Obstacle_Set($Seg_i$) of $b_i$-sized obstacles by more than 3*$b_i$.

The method (claim 14 of summary section) according to any one of claims 1-13 in the summary section, wherein the coalescence process is performed so as to reduce a population of droplets having a size of less than 40 microns by at least $x_m$% ($x_m \geq 5$).

The method (claim 15 of summary section) according to any one of claims 1-14 in the summary section, wherein the coalescence process is performed to increase a population of droplets having a size of at least y by at least $x_N$% ($x_N \geq 1$).

The method (claim 16 of summary section) according to any one of claims 1-15 in the summary section, wherein an entirety of the channel is within a prism (e.g. rectangular prism) having dimensions of x,y,z and a ratio between a length of the channel and max(x,y,z) is at least $x_O$($x_O \geq 5$).

The method (claim 17 of summary section) according to any one of claims 1-16 in the summary section, wherein a ratio between (i) an average droplet size of the second multiphase dispersion feed and (ii) the characteristic width w characterizing each of the segments is at most $x_P$($x_P \leq 1$).

The method (claim 18 of summary section) according to any one of claims 1-17 in the summary section, wherein at least a majority of the segments of Segment_Set {$Seg_1$, $Seg_2$ ... $Seg_N$} lacks sharp obstacles having a radius of curvature of at most 5 mm.

The method (claim 19 of summary section) according to any one of claims 1-18 in the summary section, wherein the second multiphase dispersion feed comprises at most 50% V/V first liquid.

The method (claim 20 of summary section) according to any one of claims 1-19 in the summary section, for each segment $Seg_i$ of Segment_Set {$Seg_1$, $Seg_2$ ... $Seg_N$} at least some or at least a majority of the $b_i$-obstacles are attached to and/or integrally formed with a channel wall.

The method (claim 21 of summary section) according to any one of claims 1-20 in the summary section, wherein the segment set {$Seg_1$, $Seg_2$ ... $Seg_N$} has first and second subsets denoted as seg-First and seg-Second, such that (i) a most downstream segment in the first subset seg-First is disposed upstream of a most upstream segment in the second subset seg-Second, (ii) a minimum $b_i$ value among segments of the first subset is defined as b-FIRST; (iii) a maximum $b_i$ value among segments of the second subset is defined as b-SECOND; and (iv) a ratio between b-SECOND and b-FIRST is at least 1.5.

The method (claim 22 of summary section) according to claim 22 in the summary section, wherein the first subset seg-First has at a cardinality of at least 3 or at least 5 or at least 10 or at least 15 and/or the second subset seg-Second has at a cardinality of at least 3 or at least 5 or at least 10 or at least 15 .

The method (claim 23 of summary section) according to any one of claims 1-22 in the summary section, wherein the segment set {$Seg_1$, $Seg_2$ ... $Seg_N$} has first, second and third subsets denoted as seg-First, seg-Second and seg-Third, such that (i) a most downstream segment in the first subset seg-First is disposed upstream of a most upstream segment in the second subset seg-Second, (ii) a most downstream segment in the second subset seg-Second is disposed upstream of a most upstream segment in the third subset seg-Third, (iii) a minimum $b_i$ value among segments of the first subset seg-First is defined as b-MIN-FIRST; (iv) a maximum $b_i$ value among segments of the second subset seg-Second is defined as b-MAX-SECOND; (v) a ratio between b-MAX-SECOND and b-MIN-FIRST is at least 1.5,(vi) a minimum $b_i$ value among segments of the second subset seg-Second is defined as b-MIN-SECOND; (iv) a maximum $b_i$ value among segments of the third subset seg-Third is defined as b-MAX-THJIRD; (v) a ratio between b-MAX-THIRD and b-MIN-SECOND is at least 1.5.

The method (claim 24 of summary section) according to claim 23 in the summary section, wherein the first subset seg-FIRST has at a cardinality of at least 3 or at least 5 or at least 10 or at least 15 and/or the second subset seg-SECOND has at a cardinality of at least 3 or at least 5 or at least 10 or at least 15 and/or the third subset seg-SECOND has at a cardinality of at least 3 or at least 5 or at least 10 or at least 15.

The method (claim 25 of summary section) according to any one of claims 1-24 in the summary section wherein a continuous phase or a disperse phase of the dispersion is crude oil, fuel-products (e.g. kerosene, diesel, jet-fuel, gasoline or any other hydrotreated product), vegetable oil, synthetic oil or any other organic liquid.

The method (claim 26 of summary section) according to any one of claims 1-24 in the summary section wherein a value of $x_A$ is at least 10.

The method (claim 27 of summary section) according to any one of claims 1-24 in the summary section wherein a value of $x_A$ is at least 25.

The method (claim 28 of summary section) according to any one of claims 1-24 in the summary section wherein a value of $x_A$ is at least 50.

The method (claim 29 of summary section) according to any one of claims 1-28 in the summary section wherein the ratio between $b_i$ and the respective individual segment average width isaw($Seg_i$) of the given segment $Seg_i$ at most 0.9.

The method (claim 30 of summary section) according to any one of claims 1-28 in the summary section wherein the ratio between $b_i$ and the respective individual segment average width isaw($Seg_i$) of the given segment $Seg_i$ at most 0.8.

The method (claim 31 of summary section) according to any one of claims 1-28 in the summary section wherein the ratio between $b_i$ and the respective individual segment average width isaw($Seg_i$) of the given segment $Seg_i$ at most 0.7.

The method (claim 32 of summary section) according to any one of claims 1-31 in the summary section wherein the ratio between $b_i$ and the respective individual segment average width isaw($Seg_i$) of the given segment $Seg_i$ at least 0.05.

The method (claim 33 of summary section) according to any one of claims 1-31 in the summary section wherein the ratio between $b_i$ and the respective individual segment average width isaw($Seg_i$) of the given segment $Seg_i$ at least 0.1.

The method (claim 34 of summary section) according to any one of claims 1-31 in the summary section wherein the ratio between $b_i$ and the respective individual segment average width isaw($Seg_i$) of the given segment $Seg_i$ at least 0.2.

The method (claim 35 of summary section) according to any one of claims 1-34 in the summary section wherein a value of $x_B$ is at least 10.

The method (claim 36 of summary section) according to any one of claims 1-34 in the summary section wherein a value of $x_B$ is at least 25.

The method (claim 37 of summary section) according to any one of claims 1-34 in the summary section wherein a value of $x_B$ is at least 50.

The method (claim 38 of summary section) according to any one of claims 1-34 in the summary section wherein a value of $x_B$ is at least 100.

The method (claim 39 of summary section) according to any one of claims 1-34 in the summary section wherein a value of $x_C$ is at least 75.

The method (claim 40 of summary section) according to any one of claims 1-34 in the summary section wherein a value of $x_C$ is at least 90.

The method (claim 41 of summary section) according to any one of claims 1-34 in the summary section wherein a value of $x_C$ is at least 95.

The method (claim 42 of summary section) according to any one of claims 1-34 in the summary section wherein a value of $x_C$ is at least 99.

The method (claim 43 of summary section) according to any one of claims 1-42 in the summary section wherein a value of $x_D$ is at least 3000.

The method (claim 44 of summary section) according to any one of claims 1-42 in the summary section wherein a value of $x_D$ is at least 3500.

The method (claim 45 of summary section) according to any one of claims 1-42 in the summary section wherein a value of $x_D$ is at least 4000.

The method (claim 46 of summary section) according to any one of claims 1-42 in the summary section wherein a value of $x_D$ is at least 4500.

The method (claim 47 of summary section) according to any one of claims 1-42 in the summary section wherein a value of $x_D$ is at least 5000.

The method (claim 48 of summary section) according to any one of claims 1-42 in the summary section wherein a value of $x_D$ is at least 5500.

The method (claim 49 of summary section) according to any one of claims 1-42 in the summary section wherein a value of $x_D$ is at least 6000.

The method (claim 50 of summary section) according to any one of claims 1-49 in the summary section wherein a value of $x_D$ is at least 45.

The method (claim 51 of summary section) according to any one of claims 1-49 in the summary section wherein a value of $x_D$ is at least 60.

The method (claim 52 of summary section) according to any one of claims 1-51 in the summary section wherein a value of $x_F$ is at least 0.6.

The method (claim 53 of summary section) according to any one of claims 1-51 in the summary section wherein a value of $x_F$ is at least 0.75.

The method (claim 54 of summary section) according to any one of claims 1-51 in the summary section wherein a value of $x_F$ is at least 0.85.

The method (claim 55 of summary section) according to any one of claims 1-51 in the summary section wherein a value of $x_F$ is at least 1.0.

The method (claim 56 of summary section) according to any one of claims 1-55 in the summary section wherein a value of $x_G$ is at most 2.25.

The method (claim 57 of summary section) according to any one of claims 1-55 in the summary section wherein a value of $x_G$ is at most 2.

The method (claim 58 of summary section) according to any one of claims 1-57 in the summary section wherein a value of $x_H$ is at least 0.6.

The method (claim 59 of summary section) according to any one of claims 1-57 in the summary section wherein a value of $x_H$ is at least 0.75.

The method (claim 60 of summary section) according to any one of claims 1-57 in the summary section wherein a value of $x_H$ is at least 0.85.

The method (claim 61 of summary section) according to any one of claims 1-57 in the summary section wherein a value of $x_H$ is at least 1.0.

The method (claim 62 of summary section) according to any one of claims 1-61 in the summary section wherein a value of x, is at most 2.25.

The method (claim 63 of summary section) according to any one of claims 1-61 in the summary section wherein a value of $x_J$ is at most 2.

The method (claim 64 of summary section) according to any one of claims 1-63 in the summary section wherein a value of $x_J$ is 25.

The method (claim 65 of summary section) according to any one of claims 1-63 in the summary section wherein a value of $x_J$ is 30.

The method (claim 66 of summary section) according to any one of claims 1-63 in the summary section wherein a value of $x_J$ is 40.

The method (claim 67 of summary section) according to any one of claims 1-64 in the summary section wherein a value of $x_K$ is 20.

The method (claim 68 of summary section) according to any one of claims 1-64 in the summary section wherein a value of $x_K$ is 30.

The method (claim 69 of summary section) according to any one of claims 1-64 in the summary section wherein a value of $x_K$ is 40.

The method (claim 70 of summary section) according to any one of claims 1-64 in the summary section wherein a value of $x_K$ is 50.

The method (claim 71 of summary section) according to any one of claims 1-70 in the summary section, wherein for each given segment $Seg_i$ of Segment_Set $\{Seg_1, Seg_2 \ldots Seg_N\}$, no point within the given segment $Seg_i$ is longitudinally displaced from a nearest obstacle of the respective set $b_i$_Obstacle_Set($Seg_i$) of $b_i$-sized obstacles by more than $2.5*b_i$.

The method (claim 72 of summary section) according to any one of claims 1-70 in the summary section, wherein for each given segment $Seg_i$ of Segment_Set $\{Seg_1, Seg_2 \ldots Seg_N\}$, no point within the given segment $Seg_i$ is longitudinally displaced from a nearest obstacle of the respective set $b_i$_Obstacle_Set($Seg_i$) of $b_i$-sized obstacles by more than $2*b_i$.

The method (claim 73 of summary section) according to any one of claims 1-70 in the summary section, wherein for each given segment $Seg_i$ of Segment_Set $\{Seg_1, Seg_2 \ldots Seg_N\}$, no point within the given segment $Seg_i$ is longitudinally displaced from a nearest obstacle of the respective set $b_i$_Obstacle_Set($Seg_i$) of $b_i$-sized obstacles by more than $1.5*b_i$.

The method (claim 74 of summary section) according to any one of claims 1-73 in the summary section, wherein the value of $x_M$ is at least 25.

The method (claim 75 of summary section) according to any one of claims 1-73 in the summary section, wherein the value of $x_M$ is at least 50.

The method (claim 76 of summary section) according to any one of claims 1-75 in the summary section, wherein an entirety of the channel is within a rectangular prism having dimensions of x,y,z and a ratio between a length of the channel and max(x,y,z) is at least 10.

The method (claim 76 of summary section) according to any one of claims 1-75 in the summary section, wherein an entirety of the channel is within a rectangular prism having dimensions of x,y,z and a ratio between a length of the channel and max(x,y,z) is at least 50.

The method (claim 76 of summary section) according to any one of claims 1-75 in the summary section, wherein an entirety of the channel is within a rectangular prism having dimensions of x,y,z and a ratio between a length of the channel and max(x,y,z) is at least 100.

The method (claim 77 of summary section) according to any one of claims 1-76 wherein a value of $x_E$ is at least 45.

The method (claim 78 of summary section) according to any one of claims 1-76 wherein a value of $x_E$ is at least 60.

The method (claim 77 of summary section) according to any one of claims 1-76 in the summary section, wherein a ratio between (i) an average droplet size of the second multiphase dispersion feed and (ii) the characteristic width w characterizing each of the segments is at most 0.5.

The method (claim 78 of summary section) according to any one of claims 1-76 in the summary section, wherein a ratio between (i) an average droplet size of the second multiphase dispersion feed and (ii) the characteristic width w characterizing each of the segments is at most 0.25.

The method (claim 79 of summary section) according to any one of claims 1-76 in the summary section, wherein a ratio between (i) an average droplet size of the second multiphase dispersion feed and (ii) the characteristic width w characterizing each of the segments is at most 0.1.

The method (claim 80 of summary section) according to any one of claims 1-76 in the summary section, wherein a ratio between (i) an average droplet size of the second multiphase dispersion feed and (ii) the characteristic width w characterizing each of the segments is at most 0.05.

The method (claim 81 of summary section) according to any one of claims 1-76 in the summary section, wherein a ratio between (i) an average droplet size of the second multiphase dispersion feed and (ii) the characteristic width w characterizing each of the segments is at most 0.01.

The method (claim 82 of summary section) according to any one of claims 1-81 wherein a value of $x_P$ is at most 0.5.

The method (claim 83 of summary section) according to any one of claims 1-81 wherein a value of $x_P$ is at most 0.25.

The method (claim 84 of summary section) according to any one of claims 1-81 wherein a value of $x_P$ is at most 0.1.

The method (claim 85 of summary section) according to any one of claims 1-81 wherein a value of $x_P$ is at most 0.05.

The method (claim 86 of summary section) according to any one of claims 1-85 in the summary section, wherein at least 75% of the segments of Segment_Set $\{Seg_1, Seg_2 \ldots Seg_N\}$ lacks sharp obstacles having a radius of curvature of at most 5 mm.

The method (claim 87 of summary section) according to any one of claims 1-85 in the summary section, wherein at least 90% of the segments of Segment_Set $\{Seg_1, Seg_2 \ldots Seg_N\}$ lacks sharp obstacles having a radius of curvature of at most 5 mm.

A coalescence system comprising: a. a static mechanical droplet-coalescer comprising a channel including a set Segment_Set $\{Seg_1, Seg_2 \ldots Seg_N\}$ of at least 10 in-series segments disposed in series with respect to each other; and b. a multiphase dispersion comprising dispersed and continuous phases of first and second liquids flowing through the static mechanical droplet-coalescer and through all segments of Segment_Set such that upon entering the first segment $Seg_1$ of set Segment_Set $\{Seg_1, Seg_2 \ldots Seg_N\}$ the multiphase dispersion comprises at least 20% v/v (by volume) first liquid, wherein each given segment $Seg_i$ is characterized by a segment-specific-characteristic obstacle size b and wherein each given segment $Seg_i$ has each of the following features: i. a ratio between a respective individual-segment length $isl(Seg_i)$ for the given segment $Seg_i$ and an respective individual segment average width $isaw(Seg_i)$ for the given segment $Seg_i$ is at least 10; ii. a ratio between $b_i$ and a respective individual segment average width thereof $isaw(Seg_i)$ for the given segment $Seg_i$ at most 0.7 and is at least 0.2; iii. at least 10 $b_i$-sized obstacles are disposed within every individual segment $Seg_i$ to form a respective set $b_i\_Obstacle\_Set(Seg_i)$ of $b_i$-sized obstacles for the given segment $Seg_i$; iv. flow throughout at least 90% of said given $Seg_i$ segment is sufficiently turbulent such that a segment-specific Reynold's number $\rho*IS\_V_{AVG}(Seg_i)*b_i/\mu$ is at least 3000 where $IS\_V_{AVG}(Seg_i)$ is the respective average velocity within the given segment; v. each $b_i$-size obstacle of the set $b_i\_Obstacle\_Set(Seg_i)$ of $b_i$-sized obstacles within the given segment $Seg_i$ is distanced from its nearest neighboring $b_i$-size obstacle within the channel by at least $0.75*b_i$ and at most $2.5*b_i$; viii. a ratio $(IS\_V_{AVG}(Seg_i))^3/b_i$ between (A) a cube of the respective average velocity $IS\_V_{AVG}(Seg_i)$ within the given segment $Seg_i$ and (B) $b_i$ is between 0.75 meter$^2$/sec$^3$ and 15 meters$^2$/sec$^3$, and wherein the multiphase dispersion is passed through the static mechanical droplet-coalescer so that a total residence time collectively in all of the segments of Segment_Set $\{Seg_1, Seg_2 \ldots Seg_N\}$ is at least 30 seconds.

In some embodiments, further comprising a fluid-flow device (e.g. pump) for forcing the multi-phase dispersion to flow through the static mechanical droplet-coalescer.

In some embodiments, further comprising a separator disposed downstream of the static coalescer and configured to receive outflow of the coalescer into the separator.

In some embodiments, the separator is a centrifuge assembly, or an electrostatic separator, or hydrocyclone or a settler.

BRIEF DESCRIPTION OF THE DRAWINGS

FIGS. 2A-2C schematically describe a static coalescer.

FIGS. 3A-3J describe obstacles.

DETAILED DESCRIPTION OF EMBODIMENTS

Embodiments of the present invention relate to the processing of a multiphase dispersion feed comprising first and second liquids, where droplets of the first liquid (dispersed phase) are dispersed in the second liquid (continuous phase). The first liquid (dispersed phase) is an organic liquid and the second liquid (continuous phase) is an aqueous liquid or vice versa, depending on the application.

In particular, embodiments of the present invention relate to 'coalescer devices' which promote coalescence between droplets of first liquid to form larger droplets of first liquid. Subsequently, after the dispersion exits the coalescer, the larger droplets are easier to remove from the second liquid (continuous phase) than the smaller droplets that coalesced into the larger droplets.

Figure 1:
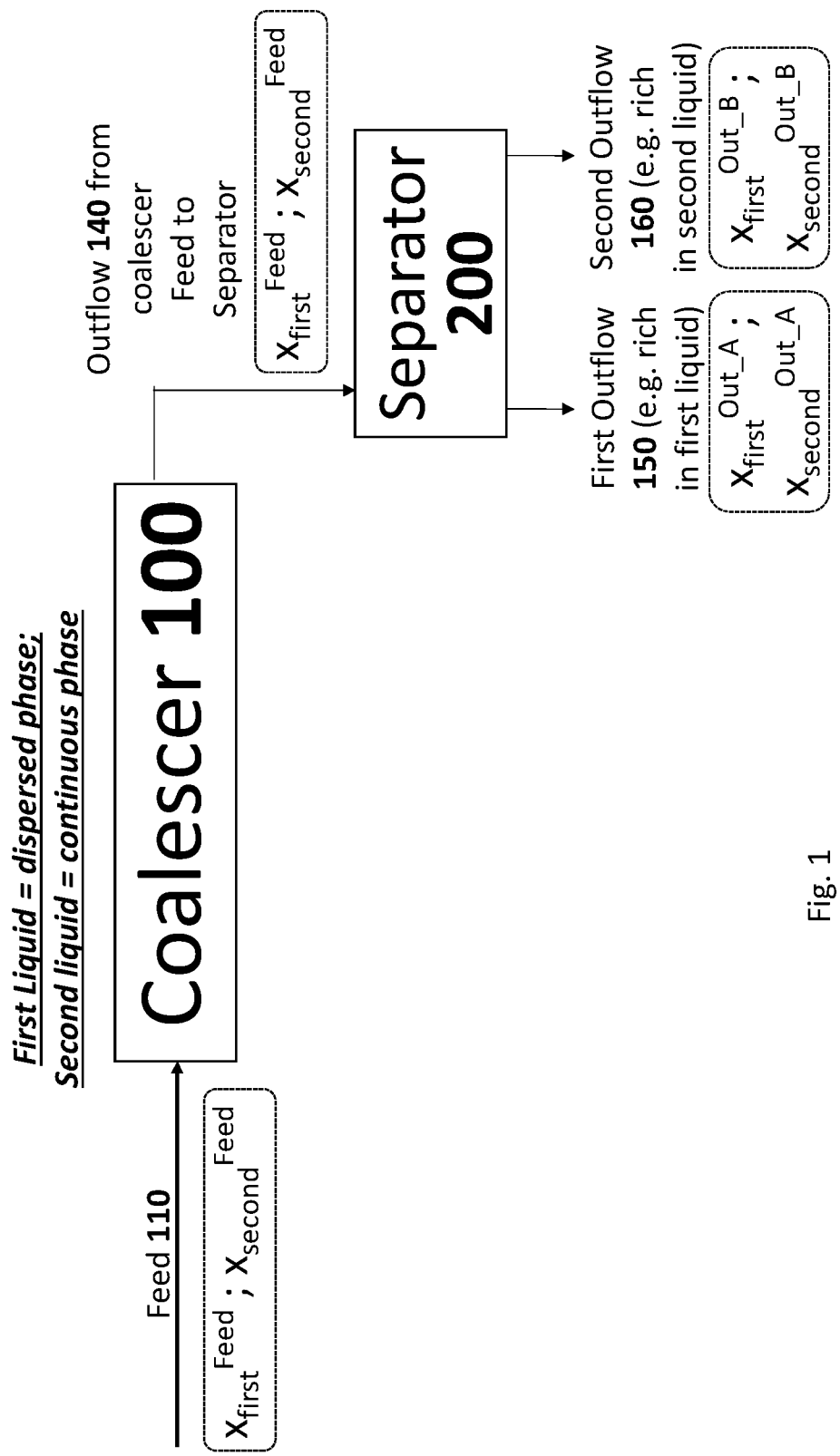
FIG. 1 is a block diagram of a system for processing a multiphase dispersion feed.

In particular, embodiments of the present invention relate to a static coalescer device where fluid is forced (e.g. pumped), under turbulent conditions, past a series of obstacles having specific geometric properties (i.e. properties of the obstacles themselves or of how they are located within a channel of the coalescer device) designed to promote coalescence between droplets of a dispersion. FIG. 1 is a block diagram of a system for processing a multiphase dispersion feed 110 comprising droplets of a first liquid dispersed in a second liquid thus, the first liquid is the 'dispersed phase' and the second liquid is the 'continuous phase'. $X_{first}^{FEED}$ is a volume fraction of the multiphase dispersion feed 110 that is the 'first liquid' (i.e. the dispersed phase); $X_{second}^{FEED}$ is a volume fraction of first multiphase dispersion feed 110 that is the second liquid. In one particular example, $0.20 \leq X_{first}^{FEED} \leq 0.495$ and/or $0.9 \leq X_{first}^{FEED} + X_{SECOND}^{FEED} \leq 1$. The term 'feed' refers to the liquid as it enters into the first 'segment' (defined below) of channel(s) of a coalescer.

As will be discussed below with reference to FIGS. 6A-6B and 7, some embodiments relate to preparing the above multiphase dispersion feed 110, in cases where the source-dispersion contains below 20% v/v of the dispersed phase, by intentionally mixing a source-dispersion where a concentration of the first liquid is less than 20% v/v (e.g. at most 10% v/v or at most 5% v/v or at most 2.5% or at most 1% v/v or at most 0.5% v/v or at most 0.25% v/v or at most 0.1% v/v or at most 0.05% v/v or at most 0.01% v/v) with an additional multiphase dispersion having a greater concentration of the first liquid ('dispersed phase'). The mixing is performed to raise a concentration of the first liquid so as to obtain a feed 110 having a concentration of the first liquid that is at least 20% v/v. More details are provided below in the discussion with reference to FIGS. 5 and 6A-6B.

The system of FIG. 1 comprises a coalescer 100 and a separator 200, where the coalescer 100 modifies a droplet size distribution to increase a concentration of droplets (i.e. of the first liquid) that are 'easily' separated from the second liquid by separator 200 and/or decrease a concentration of droplets (i.e. of the first liquid) that are 'difficult' to separate from the second liquid by separator 200. In FIG. 1, two outflows 150, 160 are shown exiting separator 200 a first outflow 150 rich in the first liquid (e.g. that is substantially entirely the first liquid) and a second 160 outflow rich in the second liquid (e.g. that is substantially entirely the second liquid).

In this manner, it is possible to separate the first liquid (i.e. dispersed phase in the feed 110) from the second liquid (i.e. continuous phase in the feed).

In different examples, separator 200 may be one or more settlers (i.e. separation based upon gravity), centrifuges, or electrostatic separators, or hydrocyclones.

Embodiments of the present invention relate to the situation where the 'coalescer' is a static coalescer i.e. comprising one or more channels where a plurality of obstacles having specific and novel geometric properties are disposed within the channel. In particular, embodiments of the present invention relate to the situation where, counterintuitively, a high degree of turbulence is desired within the coalescer.

Not wishing to be bound by theory, the present inventors have found that by judiciously sizing and spacing objects disposed within the channel, and by operating at a relatively 'high' degree of turbulence, it is possible to create conditions that promote coalescence between (i) relatively 'small' droplets that are difficult to remove from the dispersion and (ii) large droplets. Thus, by passing the dispersion through the presently disclosed static coalescer under presently disclosed conditions of turbulence, it is possible to reduce (e.g. by at least 5% or at least 10% or at least 25% or at least 50% or at least 75% or at least 90% or at least 95% or at least 99%) a population (i.e. number of droplets within a volume of the dispersion) of 'difficult-to-remove' droplets (e.g. droplets having a diameter of less than x microns wherein in different embodiments x=50 or x=40 or x=30 or x=20 or x=10 or x=15) before subsequently passing the dispersion through a separator.

In some embodiments, and as will be discussed with reference to FIGS. 5A-5B and 6, it may be advantageous, in the context of removing the dispersed phase from the continuous phase (i.e. thereby reducing the concentration of dispersed phase) and before passing the dispersion through the coalescer, to first counterintuitively raise the concentration of the dispersed phase within the dispersion before passing it through the coalescer. This may be carried out, for example, by mixing a 'pre-feed' dispersion with a separate fluid having a higher concentration of the first liquid.

Reference is now made to FIGS. 2A-2B. A coalescer includes one (see FIG. 2A) or more channels 102 (see FIG. 2B) through which a multiphase dispersion passes.

Figure 2C:
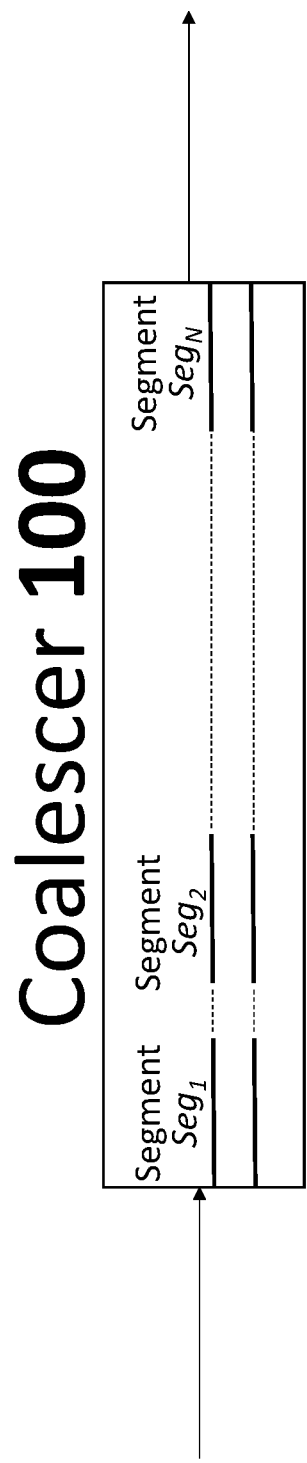

As shown in FIG. 2C, each channel comprises one or more segments that do not overlap with each other and are in series with each other so that liquid flows continuously through the segments. In FIG. 2C, N such segments are schematically illustrated where N is a positive integer these N segments are members of a set of segments. In different embodiments, the number of such in-series segments may be at least 2 or at least 5 or at least 10 or at least 25 or at least 50 or at least 100 or at least 500.

Thus, is possible to characterize geometric properties of a channel of the coalescer by describing a 'segment set' Segment_Set {$Seg_1$, $Seg_2$ ... $Seg_N$} of in-series segments of the channel where fluid flows freely between the segments (i.e. because they are portions of the same channel). By definition, these segments do not overlap with each other. By definition, a cardinality of the Segment_Set is N where in different embodiments, N≥10 or N≥25 or N≥50 or N≥100 or N≥500. The members of the Segment_Set are {$Seg_1$, $Seg_2$ ... $Seg_N$}. For any two members $Seg_i$, $Seg_j$ (1≤i≤N, 1≤j≤N, and i≠J) of Segment_Set, if i<j then $Seg_i$ is upstream of $Seg_j$.

Throughout most of the present document, a single channel will be discussed it will be appreciated that in some embodiments (see FIG. 2B), the coalescer may including a plurality of such channels in parallel with each other.

One feature provided by embodiments of the invention is a presence of obstacles within segments. In some embodiments, each segment $Seg_i$ is characterized by a parameter $b_i$ describing a length-scale in the cross-flow direction of obstacles within the segment $Seg_i$. For the particular case where the $b_i$ parameters are all equal to each other $b_1 = b_2 - \ldots = b_N$, the term b is used.

If a set of obstacles are '$b_i$-size obstacles', this means that (i) the average size among all obstacles of the set obstacles is $b_i$; and (ii) every obstacle within the set has a 'size' of at least $0.5*b_i$ and at most $2*b_i$.

FIGS. 3A-3J illustrates a portion of a single segment according to different examples. As shown in the drawings, each segment comprises a plurality of obstacles that are disposed within the channel.

Figure 3A:
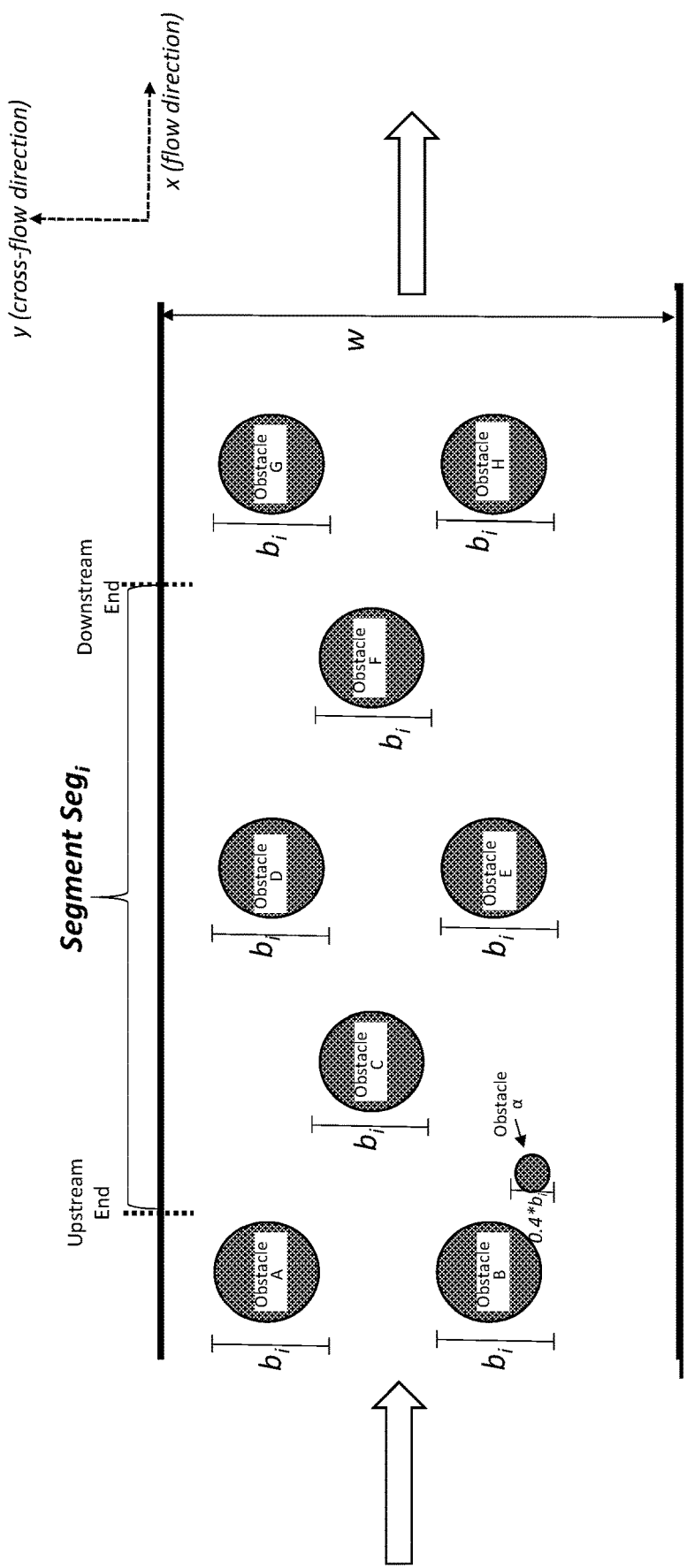
Figure 3B:
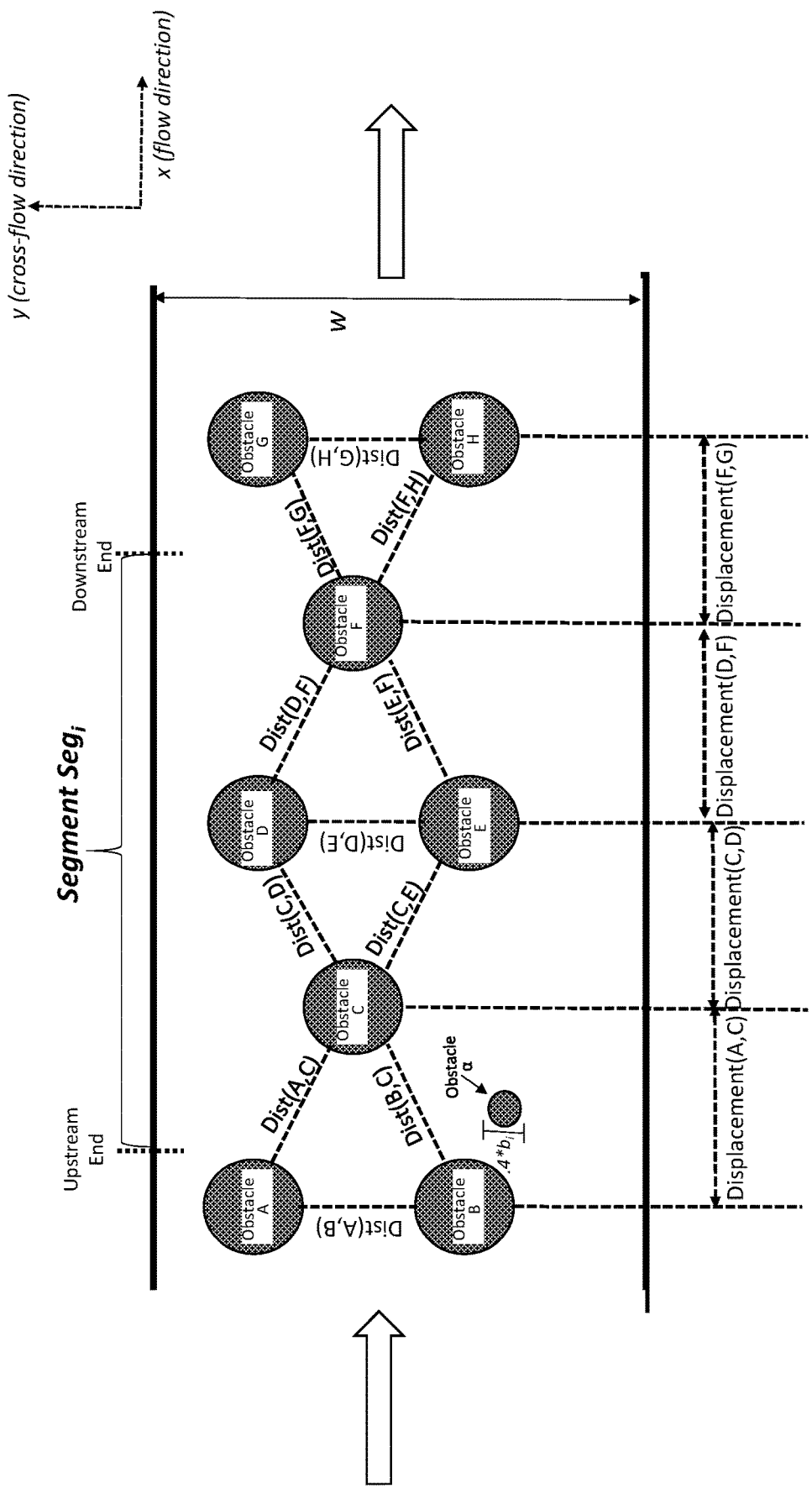
Figure 9:
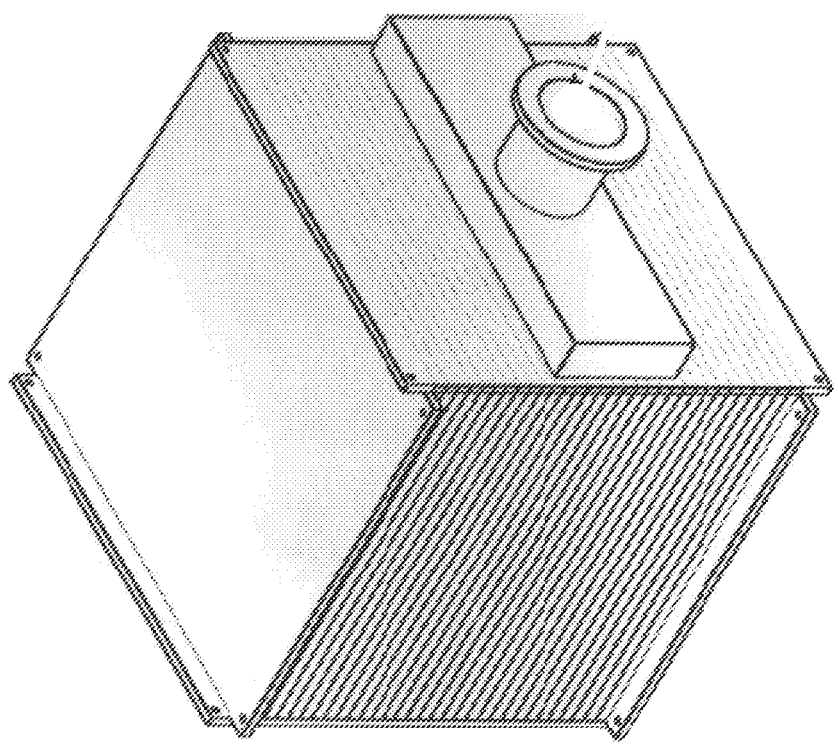
FIG. 9 illustrates a system where a setof switchbacks is disposed in every level, and every level houses a respective channel.

Reference is now made to FIGS. 3A-3B. In the example of FIGS. 3A-3B, 9 obstacles are shown, 8 of which are $b_i$-sized obstacles (defined below) (i.e. as discussed below, obstacles A-H are $b_i$-sized obstacles, while obstacle α is not a $b_i$-sized obstacle). Of the 8 $b_i$-sized obstacles shown in FIG. 3A, only four are within the 'segment' whose limits are labelled 'upstream end' and 'downstream end' these four $b_i$-sized obstacles within the segment are obstacles C-F.

Figure 3C:
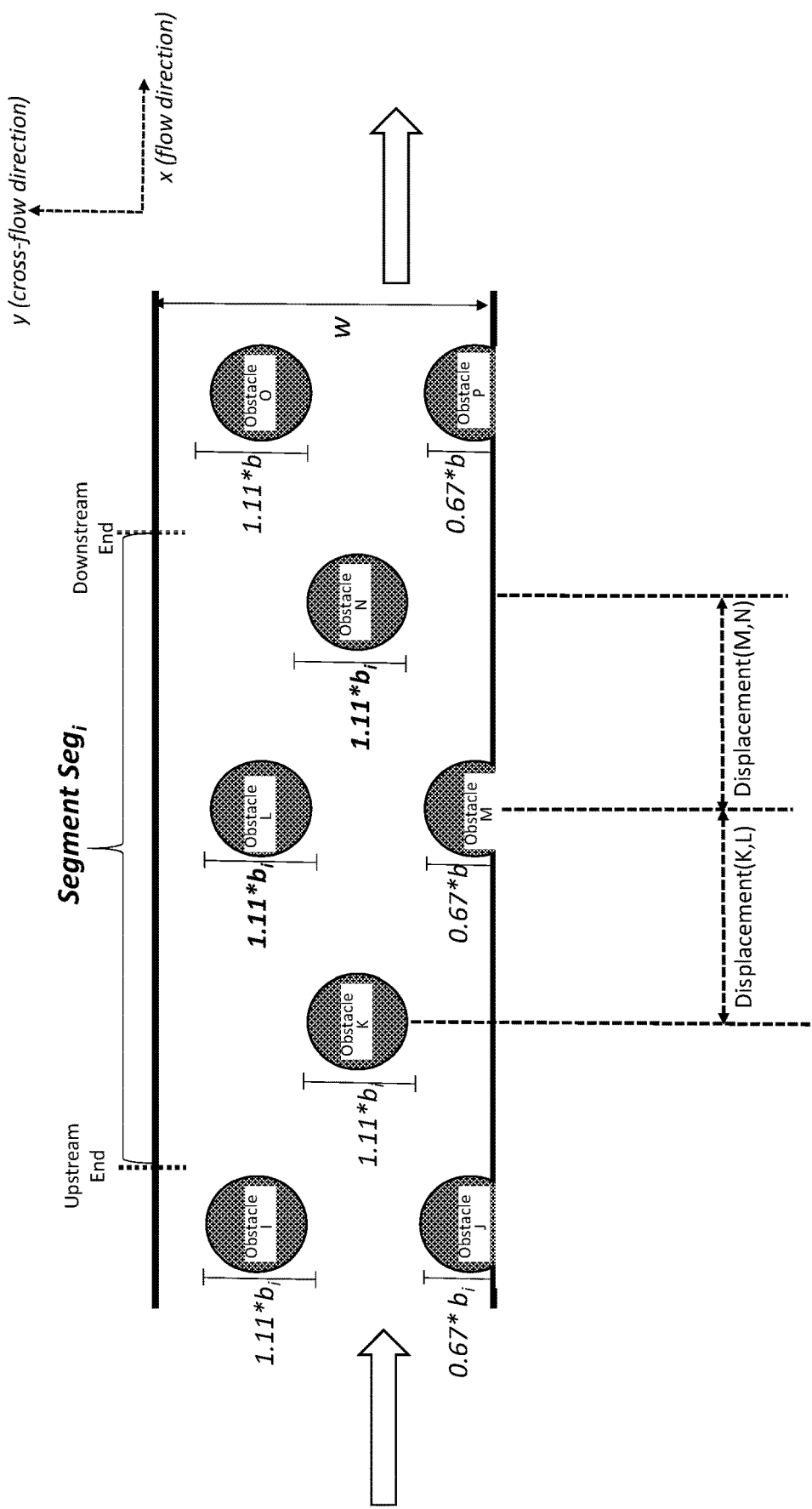

Reference is now made to FIG. 3C. Of the 8 $b_i$-sized obstacles shown in FIG. 3C, only four obstacles are within the 'segment' the obstacles are labelled as Obstacles K-N.

Figure 3D:
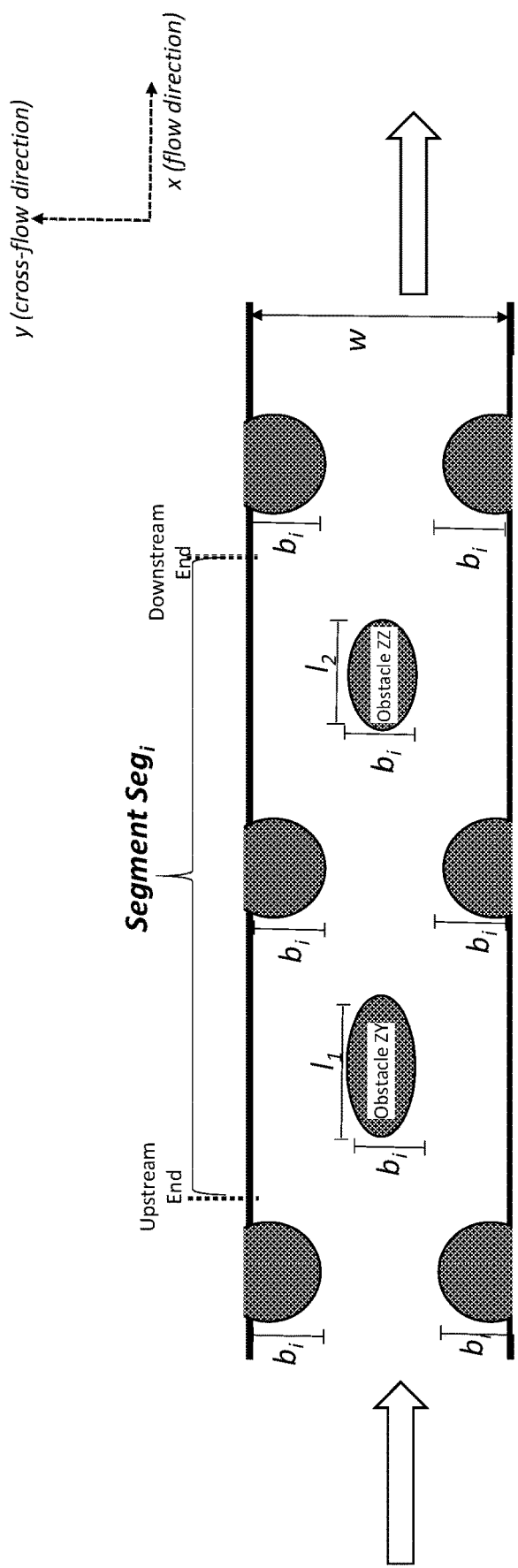

Reference is now made to FIG. 3D. Of the 8 $b_i$-sized obstacles shown in FIG. 3D, only four are within the 'segment'.

Figure 3E:
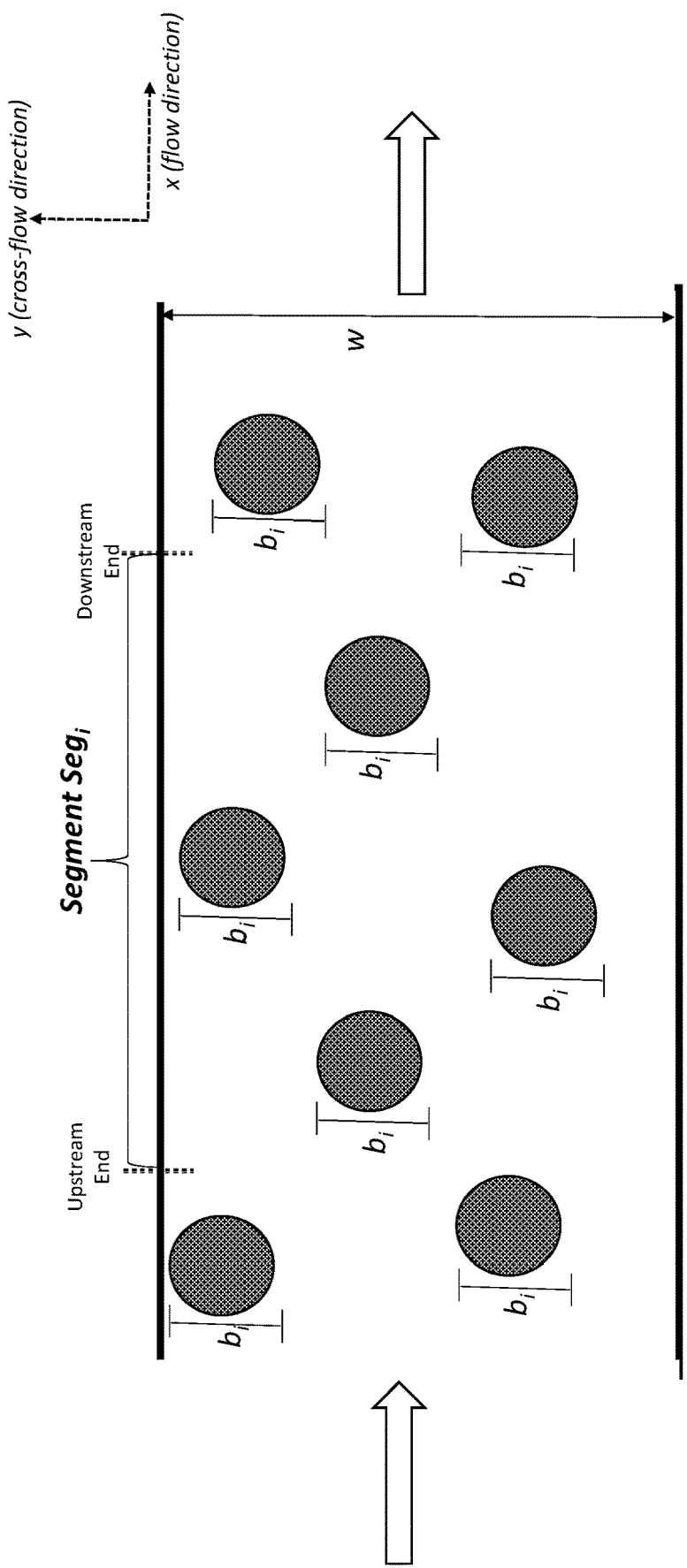

Reference is now made to FIG. 3E. Of the 8 $b_i$-sized obstacles shown in FIG. 3E, only four are within the 'segment'.

Figure 3F:
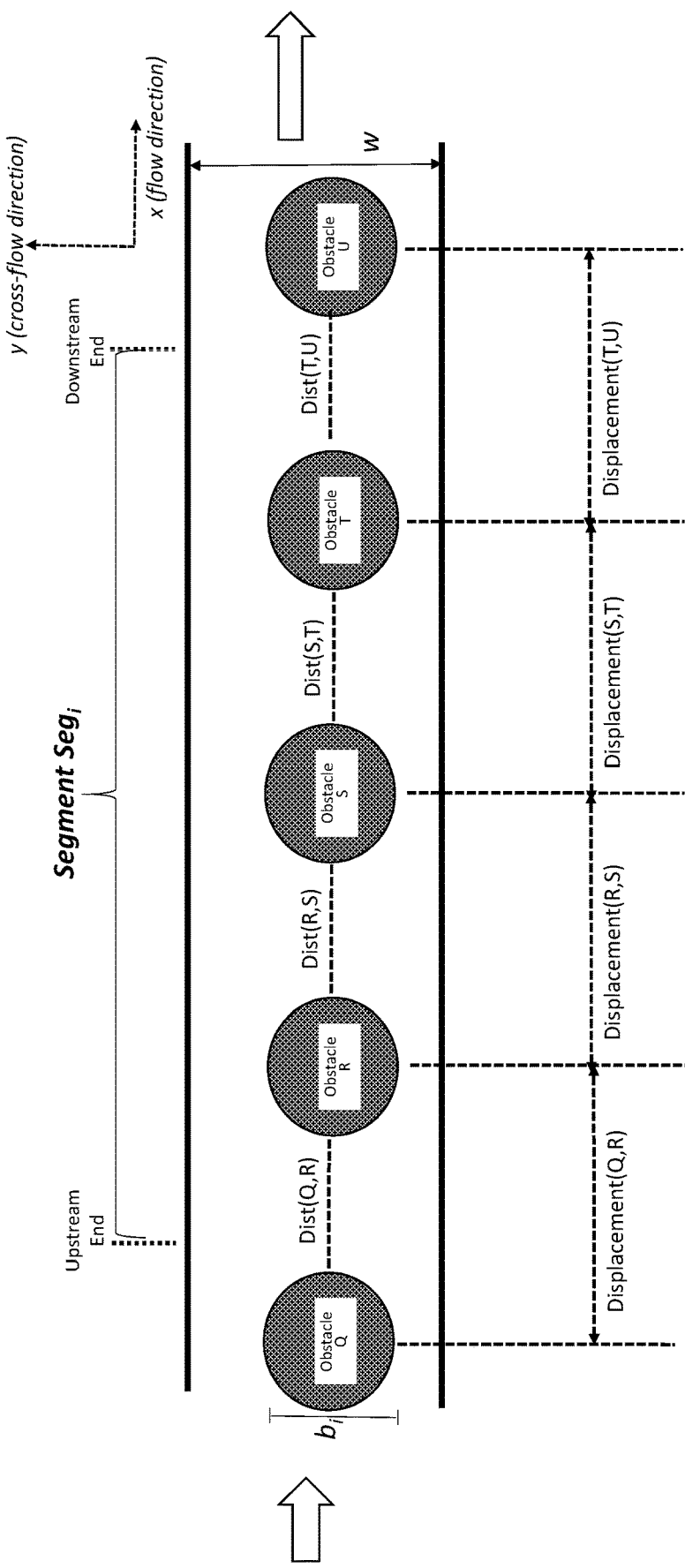

Reference is now made to FIG. 3F. Of the 5 $b_i$-sized obstacles shown in FIG. 3F, only three are within the 'segment' these obstacles are labelled R-T.

Figure 3G:
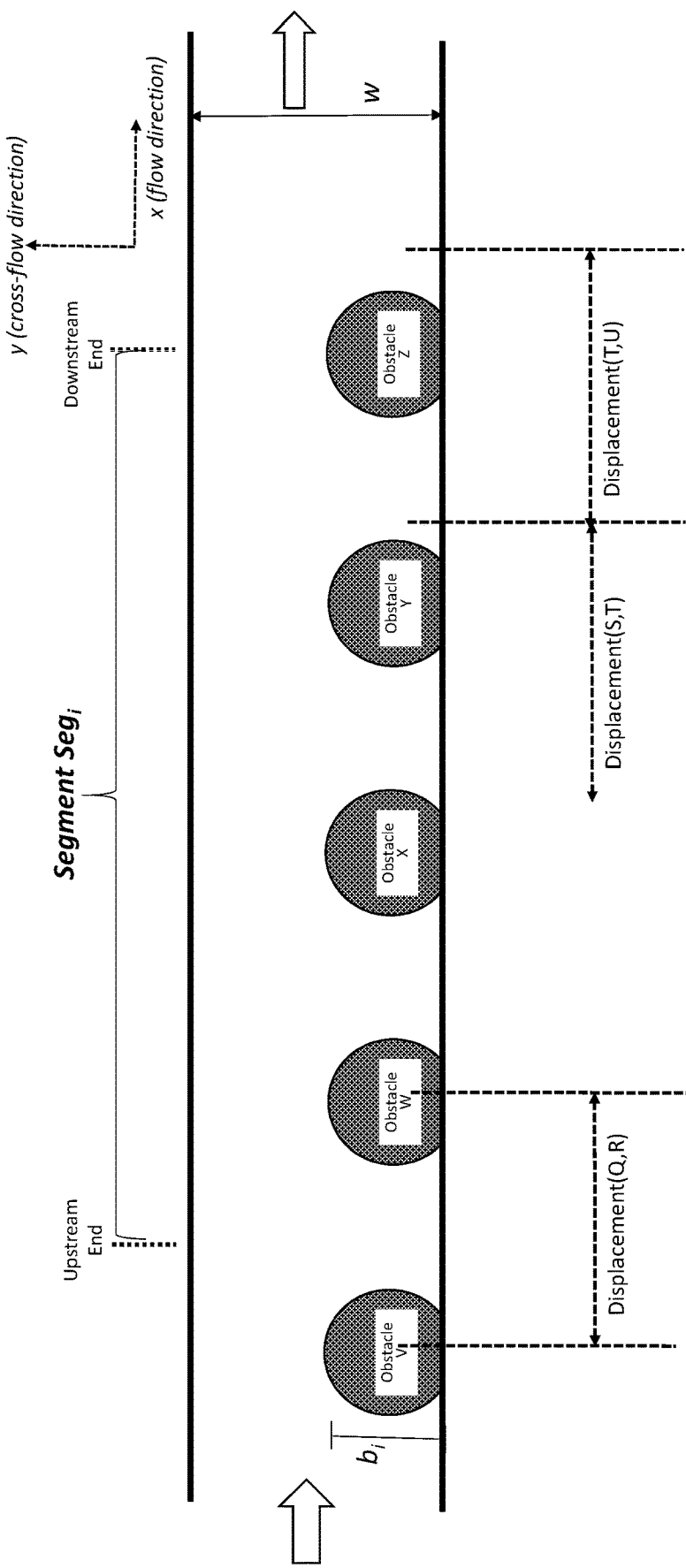

Reference is now made to FIG. 3G. Of the 5 $b_i$-sized obstacles shown in FIG. 3G, only three are within the 'segment' these obstacles are labelled W-Y.

Any obstacles disclosed herein may be free (e.g. held stable by pins), may be attached to the wall of the channel, may be formed by the wall of the channel, or may be held stable in any other manner.

Also shown in FIGS. 3A-3G is the flow direction (i.e. along the x axis) and the cross-flow direction (i.e. along the y axis).

Figure 8:
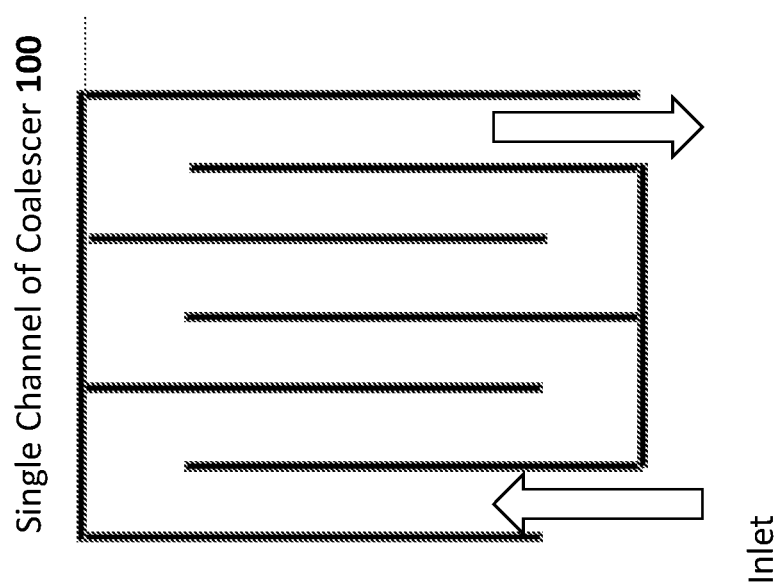
FIG. 8 illustrates a winding channel constructed from a number of switchbacks.

In the example of FIG. 3A-3B, 8 obstacles are illustrated, and are labelled obstacles A-H. Each obstacle is a cylinder having a diameter $b_i$. It is noted that the width in the cross-flow direction is what determines a 'size' of a particular obstacle. For the example of FIGS. 3A-3B, the 'size' of every obstacle is $b_i$.

As noted above, if a set of obstacles are '$b_i$-size obstacles', this means that (i) the average size among all obstacles of the set is $b_1$; and (ii) every obstacle within the set has a 'size' of at least $0.5*b_i$ and at most $2*b_i$. Thus, all of obstacles A-H may be said to be $b_i$-sized obstacles. In contrast, a size of obstacle α is $0.4*b_i$ and thus obstacle a not a $b_i$-sized obstacle.

The distance between two obstacles is indicated by the notation Dist(_,_). Thus, in FIG. 3A, 11 distances are indicated: Dist(A,B) which is the distance between obstacles A and B, Dist(A,C) which is the distance between obstacles A and C, and so on. Thus, as illustrated in FIG. 3A, the distance between two obstacles is measured not according to a distance between respective centroids of the obstacles but rather according to the minimum distance between their surfaces.

In contrast, a 'longitudinal displacement' between two obstacles is measured according to the longitudinal displacement between respective centroids of the obstacles.

In the example of FIGS. 3A-3B, (i) the following distances are each about b: Dist(A,B), Dist(D,E) and Dist(G,H); (ii) the following distances are each about $1.2*b_i$: Dist(A,C), Dist(B,C), Dist(C,D), Dist(C,E), Dist(D,F), Dist(E,F), Dist(F,G), Dist(F,H) and Dist(G,H).

The nearest neighbor of "Obstacle A" is "Obstacle B", which is distanced therefrom by b; the nearest neighbor of "Obstacle B" is "Obstacle A", which is distanced therefrom by b; the nearest neighbors of "Obstacle C" are obstacles "A," "B," "D," and "E," each of which is distanced therefrom by $1.2*b_i$.

Thus, in the example of FIGS. 3A-3B, it may be said that each $b_i$-size obstacle within the segment (i.e. the illustrated $b_i$-size obstacles are obstacles A-H and do not include obstacle a which is not a $b_i$-sized obstacle as stated above, there are 5 $b_i$-sized obstacles within the segment) is distanced from its nearest neighboring $b_i$-size obstacle by at least $0.75*b_i$ and at most $2.5*b_i$ since $0.75*b_i \le b_i \le 2.5*b_i$ and since $0.75*b_i \le 1.2 b_i \le 2.5*b_i$. The nearest neighbor is within the channel but does not need to be within the segment. It is noted that a distance (i.e. nearest point distance) between obstacle B and obstacle a is less than $0.75*b_i$. However, obstacle a is not $b_i$-sized obstacle (due to its small size), and a distance between obstacle B and its nearest neighboring $b_i$-size obstacle is Dist(A,B)=$b_i$.

As shown in FIGS. 3A-3B, centroids of obstacles A and B are longitudinally aligned with each other; centroids of obstacles D and E are longitudinally aligned with each other; and centroids of obstacles G and H are longitudinally aligned with each other. In FIGS. 3A-3B, Displacement(A,C)=$1.7*b_i$, Displacement(C,D)=$1.7*b_i$, Displacement(D,F)=$1.7*b_i$, and Displacement(F,G)=$1.7*b_i$.

By way of example, obstacle C is upstream longitudinally-displaced from obstacles D and E by $1.7*b_i$ (i.e. $1.7*b_i$ is the longitudinal displacement between a centroid of obstacle C and a centroid of obstacle D; and $1.7*b$ is the longitudinal displacement between a centroid of obstacle C and a centroid of obstacle E).

Obstacle C is downstream longitudinally-displaced from obstacles A and B by $1.7*b_i$ (i.e. $1.7*b_i$ is the longitudinal displacement between a centroid of obstacle C and a centroid of obstacle A; and $1.7*b_i$ is the longitudinal displacement between a centroid of obstacle C and a centroid of obstacle A). For at least the following six $b_i$-sized obstacles, it may be said that each of the $b_i$-sized obstacles is upstream longitudinally-displaced from another $b_i$-sized obstacle by at least $0.75*b_i$ and at most $2.5*b_i$ (i) obstacle A which is upstream longitudinally-displaced from obstacle C by at least $0.75*b_i$ and at most $2.5*b_i$; (ii) obstacle B which is upstream longitudinally-displaced from obstacle C by at least $0.75*b_i$ and at most $2.5*b_i$; (iii) obstacle C which is upstream longitudinally-displaced from obstacles D and E by at least $0.75*b_i$ and at most $2.5*b_i$; (iv) obstacle D which is upstream longitudinally-displaced from obstacle F by at least $0.75*b_i$ and at most $2.5*b_i$; (v) obstacle E which is upstream longitudinally-displaced from obstacle F by at least $0.75*b_i$ and at most $2.5*b_i$; (vi) obstacle F which is upstream longitudinally-displaced from obstacles G and H by at least $0.75*b_i$ and at most $2.5*b_i$.

For at least the following six $b_i$-sized obstacles, it may be said that each of the $b_i$-sized obstacles is downstream longitudinally-displaced from another $b_i$-sized obstacle by at least $0.75*b_i$ and at most $2.5*b_i$ (i) obstacle G which is downstream longitudinally-displaced from obstacle F by at least $0.75*b_i$ and at most $2.5*b_i$; (ii) obstacle H which is downstream longitudinally-displaced from obstacle F by at least $0.75*b_i$ and at most $2.5*b_i$; (iii) obstacle F which is downstream longitudinally-displaced from obstacles D and E by at least $0.75*b_i$ and at most $2.5*b_i$; (iv) obstacle D which is downstream longitudinally-displaced from obstacle C by at least $0.75*b_i$ and at most $2.5*b_i$; (v) obstacle E which is downstream longitudinally-displaced from obstacle C by at least $0.75*b_i$ and at most $2.5*b_i$; (vi) obstacle C which is downstream longitudinally-displaced from obstacles A and B by at least $0.75*b_i$ and at most $2.5*b_i$.

Thus, for each the four $b_i$ sized obstacles (obstacles C-F) within the 'segment' of FIGS. 3A-3B, it may be said that: (i) each $b_i$-size obstacle within the segment is distanced (i.e. distance between nearest points on the obstacles) from its nearest neighboring $b_i$-size obstacle (the nearest neighbor $b_i$-sized obstacle should be located in the same channel but there is no requirement that the nearest neighboring $b_i$-sized obstacle is also 'within the segment') by at least $0.75*b_i$ and at most $2.5*_i$b; (ii) each $b_i$-size obstacle within the segment is upstream longitudinally-displaced (i.e. in contrast to the 'distance' between obstacles, the longitudinal displacement is measured between centroids of each obstacle) from another $b_i$-size obstacle (the 'another' $b_i$-sized obstacle may or may not be located within the same segment) by at least $0.75*b_i$ and at most $2.5*b_i$; and (iii) each $b_i$-size obstacle within the segment is downstream longitudinally-displaced (i.e. in contrast to the 'distance' between obstacles, the longitudinal displacement is measured between centroids of each obstacle) from another $b_i$-size obstacle (the 'another' $b_i$-sized obstacle may or may not be located within the same segment) by at least $0.75*b_i$ and at most $2.5*b_i$.

As noted above, all $b_i$-sized obstacles in the example of FIGS. 3A-3B have a 'size' of exactly $b_i$ in the example of FIGS. 3A-3B an average size of all $b_i$-sized obstacles is exactly b. Similarly, in the example of FIG. 3C, an average size of all $b_i$-sized obstacles within the 'segment' (i.e. the four obstacles K-N) is $b_i$. However, in the example of FIG. 3C some obstacles are larger than others.

In the example of FIG. 3C, obstacle K is distanced from a nearest neighboring $b_i$-sized obstacle (i.e. any of obstacles I-J or L-M) by $1.3*b_i$. This is also true about obstacles L-N. Furthermore, obstacle K is downstream longitudinally-displaced (i.e. displacement between centroids) from obstacles I or J by $2*b_i$, and is upstream longitudinally-displaced from obstacles L-M by $2*b_i$.

In the example of FIG. 3D, not every obstacle has the same shape however, every obstacle in this particular example has the same width in the cross-flow direction (i.e. $b_1$).

For the present disclosure, a 'width/length aspect ratio' is a ratio between (i) a width of an obstacle (i.e. its width in the cross-flow direction—also referred to as its 'size') and (ii) a length of the obstacle (i.e. in the flow direction). Thus, in FIG. 3A, the width/length aspect ratio of every obstacle is exactly 1. In the example of FIG. 3D, a 'width/length' aspect ratio of Obstacle "ZY" is $b_i/l_1$ which is less than 1, and a width/length aspect ratio of Obstacle "ZZ" is $b_i/l_2$ which is also less than 1.

FIG. 3E shows another example.

In the example of FIG. 3F, there are 3 obstacles within the segment—obstacles R-T, each of which have the same size and each of which are $b_i$-sized.

In the example of FIG. 3F, Dist(Q,R)=Dist(R,S)=Dist(S,T)=Dist(T,U)=$b_i$ and Displacement(Q,R)=Displacement(R,S)=Displacement(S,T)=Displacement(T,U)=$2*b_i$.

In the example of FIG. 3G, Dist(V,W)=Dist(W,X)=Dist(X,Y)=Dist(Y,Z)=$1.1*b_i$, and Displacement(V,W)=Displacement(W,X)=Displacement(X,Y)=Displacement(Y,Z)=$2.2*b_i$.

Figure 3H:
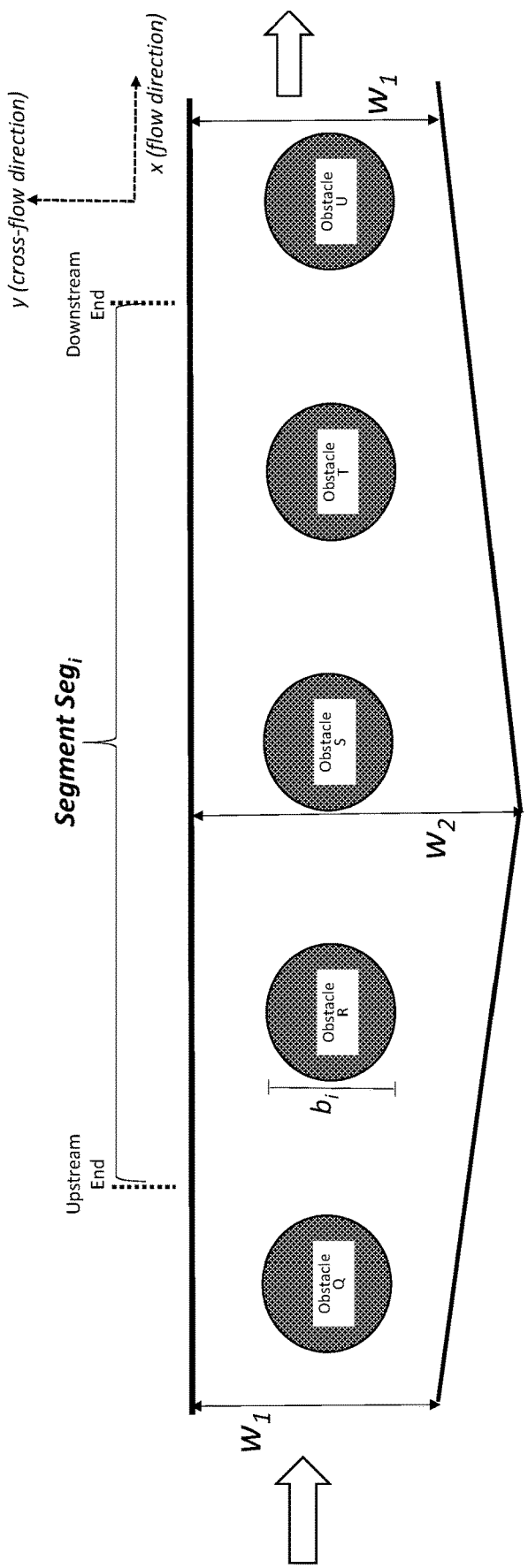
Figure 31:
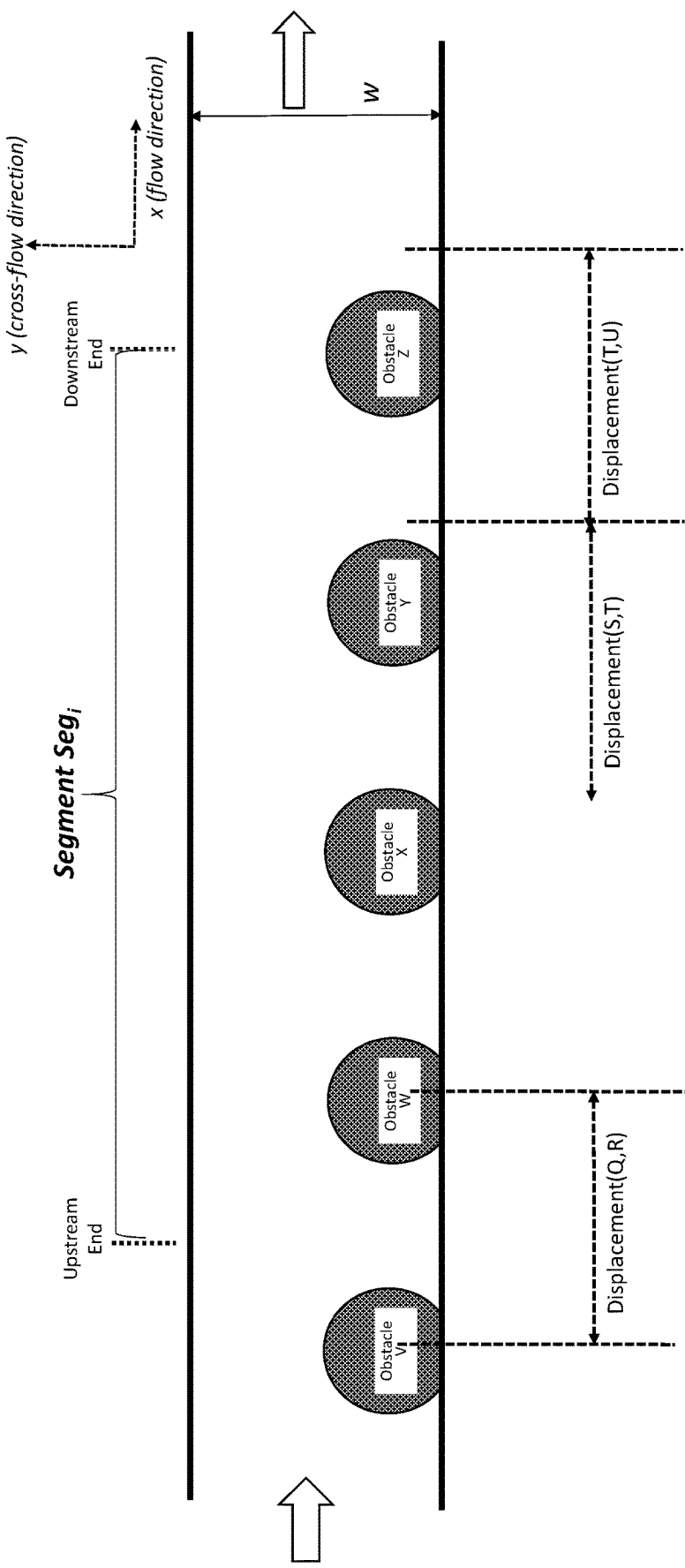

The width of a segment is not required to be constant—see FIG. 3H.

FIG. 3I is an example where the obstacles are attached to and/or part of the wall.

Figure 3J:
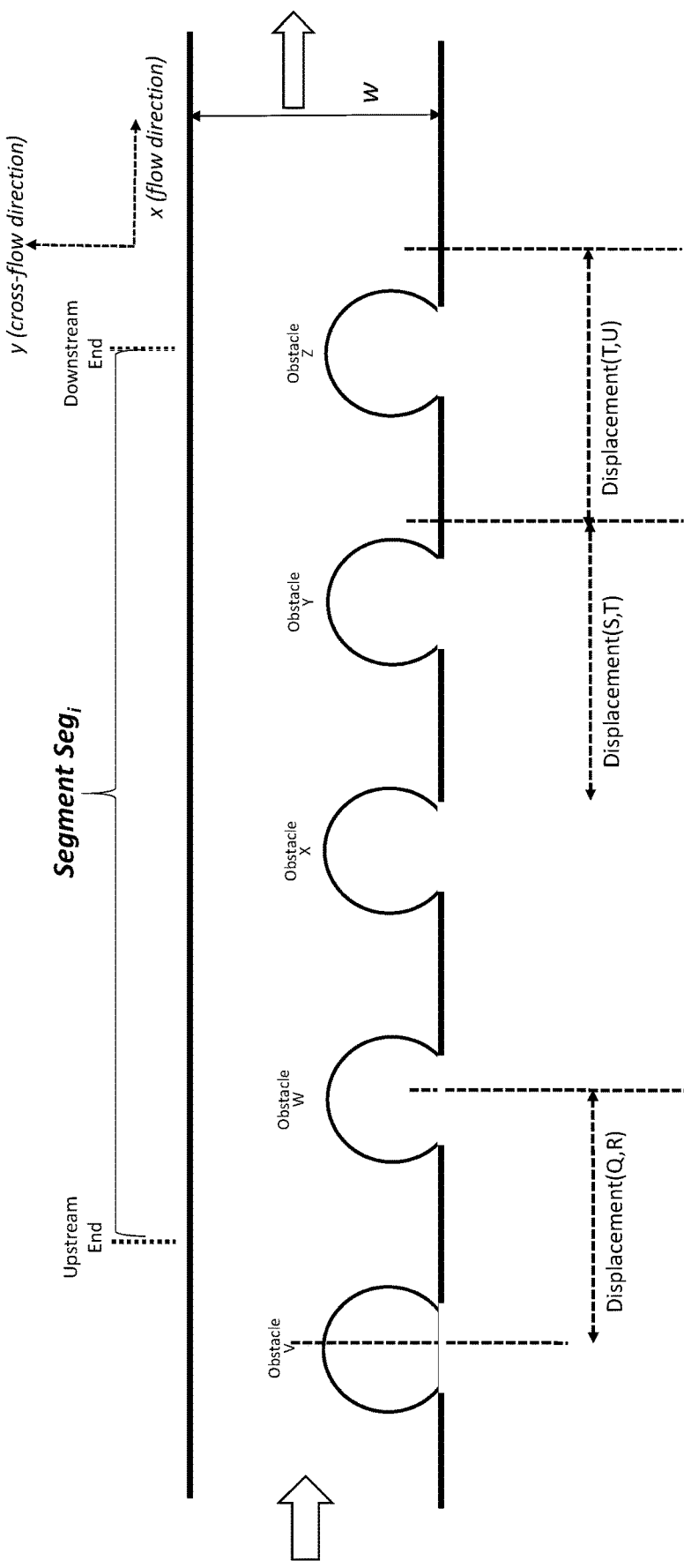

It is noted that obstacles are not required to be solid in FIG. 3J, the obstacles are hollow.

For the present disclosure, a 'segment of a channel' may be referred to 'channel segment' or just as a 'segment.'

As noted above with reference to FIGS. 2C, (i) the coalescer comprises one or more channels (e.g. a plurality of in-parallel channels); (ii) properties of an individual channel of the coalescer may be described in terms of a set of segments Segment_Set (i.e. in-series segments of the channel) or of members thereof {$Seg_1$, $Seg_2$ ... $Seg_N$}.

$Seg_i$ refers to the $i^{th}$ segment where i is a positive integer $1 \leq i \leq N$ Each segment $Seg_i$ may be characterized by a property Property—examples of properties are (i) an average width of an individual segment ('individual-segment-average-width') $Seg_i$ is individual_segment_average_width ($Seg_i$) or isaw($Seg_i$); (ii) a length of an individual segment $Seg_i$ is individual_segment_length($Seg_i$) or isl($Seg_i$), (iii) a number of obstacles disposed within an individual segment $Seg_i$ is obstacle_count_within_individual_segment($Seg_i$) or ocwis($Seg_i$), (iv) a number of $b_i$-sized obstacles disposed within an individual segment $Seg_i$ is $b_i$-sized-obstacle_count_within_individual_segment($Seg_i$) or $b_i$_ocwis($Seg_i$), and so on.

Figure 4A:
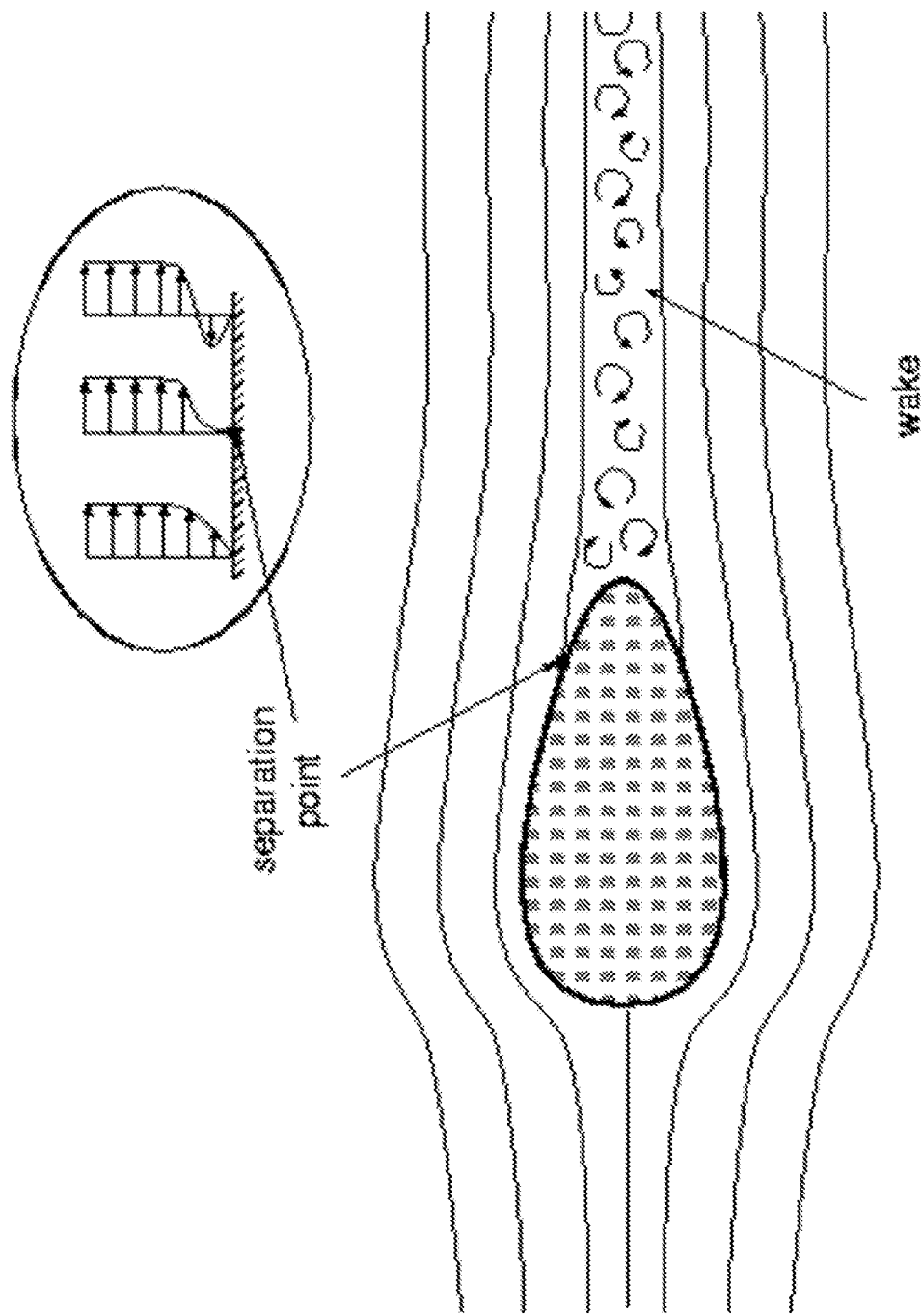
FIGS. 4A-4C describe flow around obstacles.

FIG. 4A relates to the well-known concept of flow separation. At the downstream side of the obstacle, there are one or more 'separation points' downstream of the obstacle, a flow-separation-zone is formed.

Figure 4B:
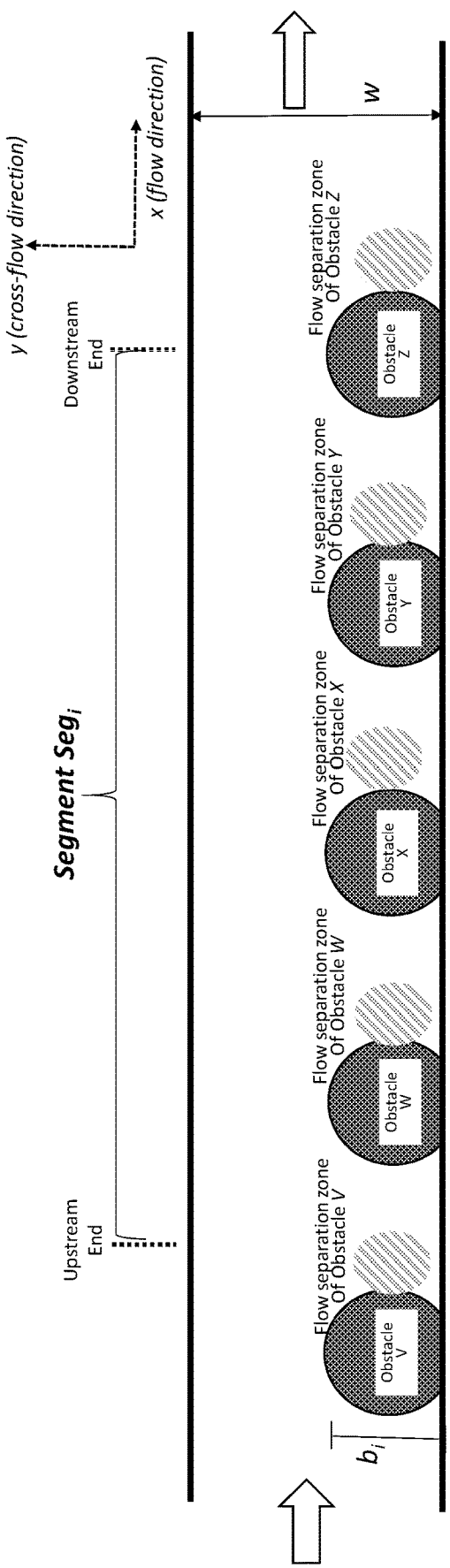
Figure 4C:
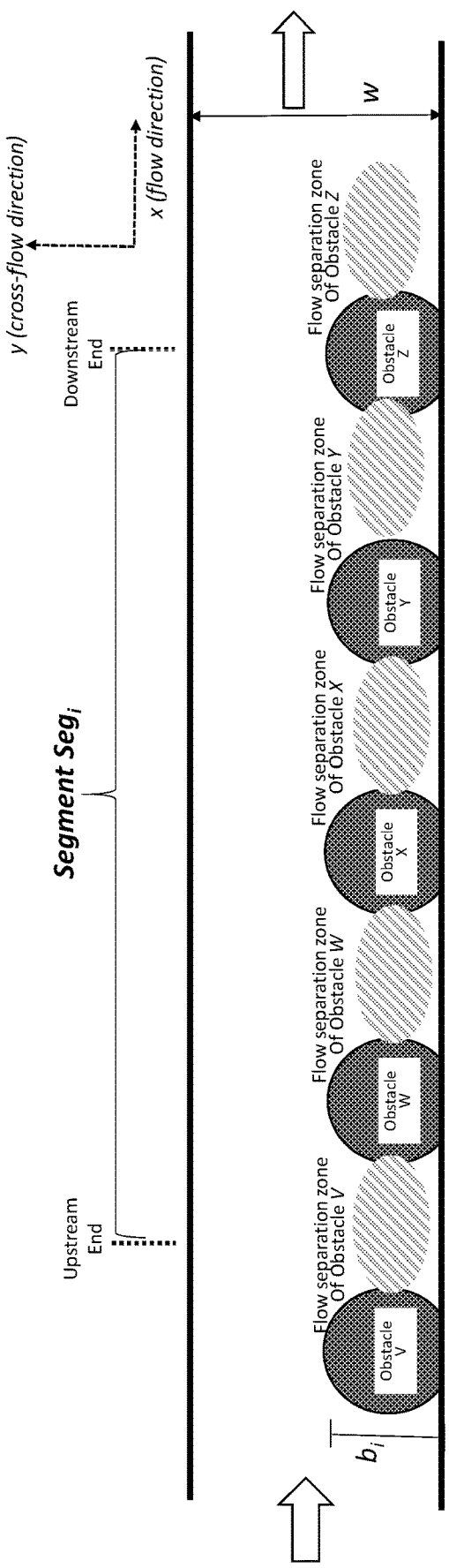

The example of FIG. 4B (corresponding to FIG. 3G) relates to some embodiments of the invention. In this example, downstream of each obstacle, a different flow separation zone is formed. In the example shown in FIG. 4B, the flow-separation-zone for obstacle V does not touch obstacle W, the flow-separation-zone for obstacle W does not touch obstacle X, and so on. As shown in FIG. 4C (yet another example), this is not a requirement. One common feature, provided by some embodiments and illustrated in the examples of both FIGS. 4B and 4C, is that each flow-separation-zone is distinct/separate.

Figure 5:
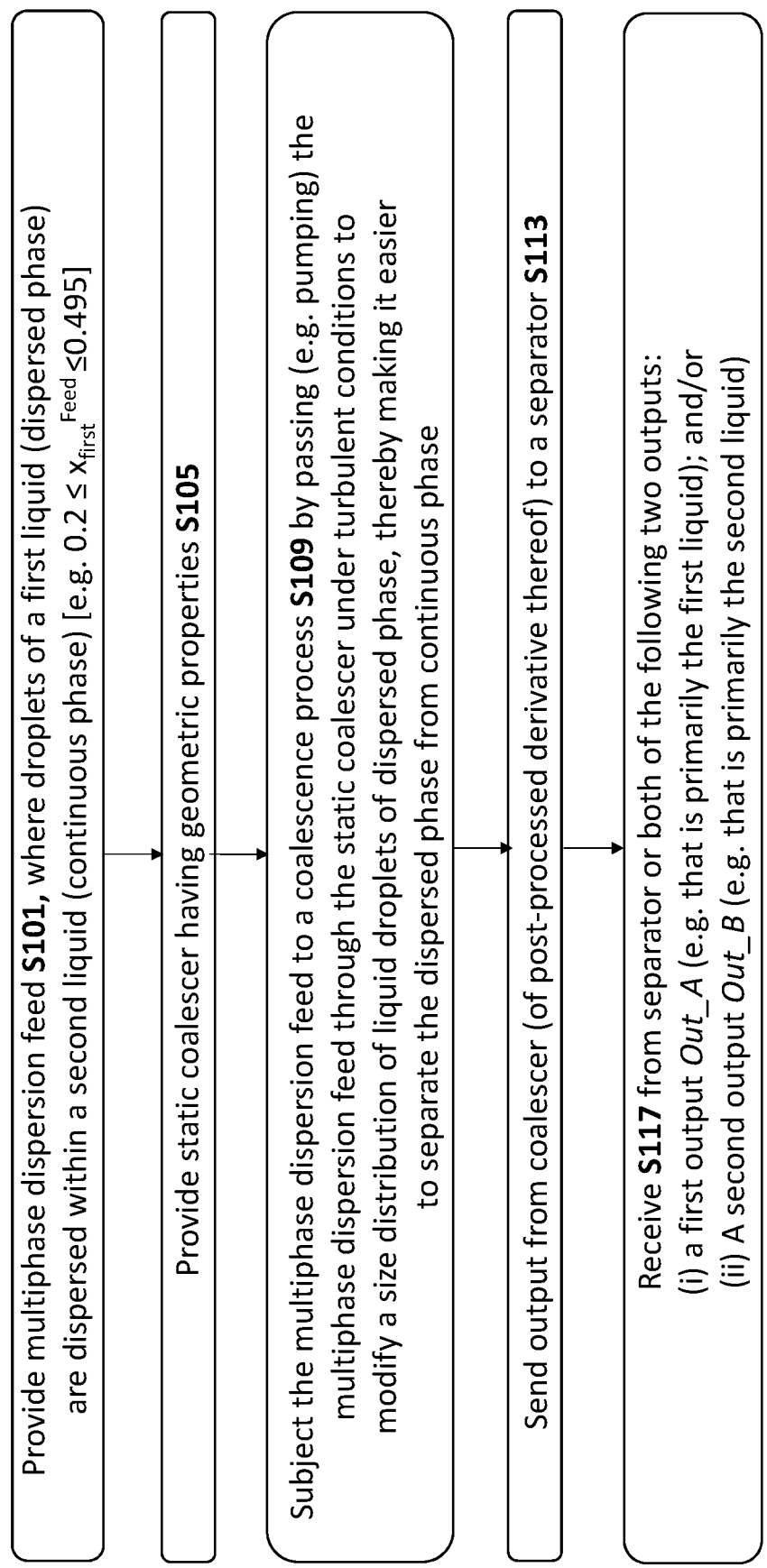
FIGS. 5 and 7 are flow charts of a coalescence method.

FIG. 5 is a flow chart of a coalescence method in different embodiments, some but not all steps listed in FIG. 5 are performed. In S101 of FIG. 5, a multiphase feed 110 (e.g. an emulsion—in one example, a water-in-oil emulsion and in another example, an oil-in-water emulsion) is provided. The multiphase dispersion feed comprises dispersed and continuous phases of first and second liquids. As noted above, in some embodiments, $0.20 \leq X_{first}^{FEED} \leq 0.495$ and/or $0.9 \leq X_{first}^{FEED} + X_{SECOND}^{FEED} \leq 1$. where $x_{First}^{FEED}$ is the fraction by volume (i.e. V/V) of the first liquid (i.e. dispersed phase) within the feed, and $X_{SECOND}^{FEED}$ is the fraction of by volume of the second liquid. In different embodiments, a value of $X_{first}^{FEED}$ is at least 0.2 or at least 0.25 or at least 0.3 or at least 0.4. The term 'feed' refers to the liquid as it enters into the first 'segment' (defined below) of channel(s) of a coalescer.

In step S105, a static coalescer having specific geometric properties is provided. Each segment $Seg_i$ is characterized by a parameter $b_i$ describing a length-scale of obstacles within the segment $Seg_i$. In different embodiments, for at least a majority (e.g. at least 50% or at least 75% or at least 90% or all segments of the Segment_Set) of the segments of Segment_Set (i.e. in-series segments of the channel) of a value of $b_i$ is at least 10 mm or at least 20 mm or at least 100 mm and/or at most 500 mm or at most 200 mm or at most 150 mm or at most 100 mm or at most 50 mm. In addition to the per-segment parameter $b_i$, geometric properties may be described in terms of a set of segments Segment_Set (i.e. in-series segments of the channel) or of members thereof {$Seg_1$, $Seg_2$ ... $Seg_N$}.

In different embodiments, the segments Segment_Set has one or more of the following properties:

(A) for every individual segment $Seg_i$(i is a positive integer $1 \leq i \leq N$) of Segment_Set, a ratio between a respective individual-segment length thereof isl($Seg_i$) and an respective individual segment average width thereof isaw($Seg_i$) is at least 5 or at least 10 or at least 25 or at least 50.

(B) the individual segments $Seg_i$(i is a positive integer $1 \leq i \leq N$) of Segment_Set all have an individual-segment-average-width that is the same order of magnitude thus, in different embodiments, a ratio between max isaw(Segment_Set) and min_isaw(Segment_Set) is at most 3 or at most 2 or at most 1.5 or at most 1.25 or at most 1.1; and/or (C) every individual segment $Seg_i$(i is a positive integer $1 \leq i \leq N$) of Segment_Set hosts a set b_Obstacle_Set($Seg_i$) of $b_i$-sized obstacles (i.e. all of the $b_i$-sized obstacles are disposed within the segment $Seg_i$) based upon the value of $b_i$. In different embodiments, set b Obstacle_Set($Seg_i$) of $b_i$-sized obstacle has one or more of (i.e. any combination of) the following properties:

I. for every individual segment $Seg_i$, a cardinality (i.e. number of $b_i$-sized obstacles in $b_i$_Obstacle_Set($Seg_i$)) of set $b_i$_Obstacle_Set($Seg_i$) of $b_i$-sized obstacle is at least 5 or at least 10 or at least 25 or at least 50 or at least 100 or at least 500;

II. a length of each segment is at least 30 cm or at least 50 cm or at least 100 cm;

III. an average width of each segment is at least 15 mm or at least 20 mm or at least 30 mm or at least 50 mm or at least 100 mm or at least 200. Alternatively or additionally, this width is at most 200 mm or at most 100 mm or at most 50 mm.

III. for every individual segment $Seg_i$, a ratio between (i) the parameter b and (ii) an individual-segment average width isaw($Seg_i$) of the segment $Seg_i$ within which the set b_Obstacle_Set($Seg_i$) of $b_i$-sized obstacles is at most 0.8 or at most 0.7 or at most 0.6 or at most 0.5 or at most 0.4 or at most 0.3 or at most 0.2 or most 0.1. Alternatively or additionally, this ratio is at least 0.05 or at least 0.1 or at least 0.2.

III. for every individual segment $Seg_i$, every $b_i$-sized obstacle of b_Obstacle_Set($Seg_i$) is distanced from a nearest neighboring $b_i$-sized obstacle (i.e. the nearest neighboring $b_i$-sized obstacle is in the same channel but is not required to be in the same segment) by (i) at least $0.75*b_i$ or at least $0.9*b_i$ or at least $b_i$ and/or (ii) by at most $3*b_i$ or at most $2.5*b_i$ or at most $2.25*b_i$ or at most $2*b_i$;

IV. for every individual segment $Seg_i$, every $b_i$-sized obstacle of b_Obstacle_Set($Seg_i$) upstream longitudinally-displaced from another $b_i$-sized obstacle (i.e. in the same channel but is not required to be in the same segment) by (i) at least $0.75*b_i$ or at least $0.9*b_i$ or at least $b_i$ and/or (ii) by at most $3*b_i$ or at most $2.5*b_i$ or at most $2.25*b_i$ or at most $2*b_i$; and/or V. for every individual segment $Seg_i$, every $b_i$-sized obstacle of b_Obstacle_Set($Seg_i$) downstream longitudinally-displaced from another $b_i$-sized obstacle (i.e. in the same channel but is not required to be in the same segment) by (i) at least $0.75*b_i$ or at least $0.9*b_i$ or at least $b_i$ and/or (ii) by at most $3*b_i$ or at most $2.5*b_i$ or at most $2.25*b_i$ or at most $2*b_i$;

VI. for every individual segment $Seg_i$, at least 50% or at least 75% or at least 90% or all $b_i$-sized obstacles within segment $Seg_i$, have a width/length aspect ratio that is at least 0.2 or at least 0.3 or at least 0.4 or at least 0.5.

In step S109, the dispersion feed is passed through the coalescer, and thus passes through each segment of Segment_Set. In some embodiments, this is performed so that a (i) residence time of the dispersion within the coalescer is at least 20 seconds or at least 30 seconds or at least 1 minute and/or(ii) a collective residence time within all segments of Segment_Set is at least 20 seconds or at least 30 seconds or at least 1 minute.

Step S109 is performed under turbulent conditions. In particular, an average velocity of liquids within each segment $Seg_i$(i is a positive integer $1 \le i \le N$) of Segment_Set is denoted as individual_segment_average_velocity($Seg_i$) or IS_$V_{AVG}$($Seg_i$). As noted elsewhere, each segment $Seg_i$ is characterized by a parameter $b_i$ describing a length-scale in the cross-flow direction of obstacles within the segment $Seg_i$. In some embodiments, for each segment $Seg_i$(i is a positive integer $1 \le i \le N$) of Segment_Set, a segment-specific Reynold's number Re($Seg_i$)=$\rho*$IS_$V_{AVG}$($Seg_i$)$*b_i/\mu$ is at least 2000 or at least 3000 or at least 3500 or at least 4000 or at least 4500 or at least 5000 or at least 5500 or at least 6000, $\rho$ is the density of the continuous phase (i.e. second liquid) and $\mu$ is the viscosity of the continuous phase (i.e. second liquid).

In some embodiments, step S109 is performed so that for each segment segment $Seg_i$(i is a positive integer $1 \le i \le N$) of Segment_Set, a ratio (IS_$V_{AVG}$($Seg_i$))$^3/b_i$ is) (i) at least 0.5 meter$^2$/sec$^3$ or at least 0.75 meter$^2$/sec$^3$ or at least 0.9 meter$^2$/sec$^3$ or at least 1 meter$^2$/sec$^3$ and/or (ii) at most 20 meter$^2$/sec$^3$ or at most 15 meter$^2$/sec$^3$ or at most 12.5 meter$^2$/sec$^3$ or at most 10 meter$^2$/sec$^3$. In some embodiments, one or more of (i.e. any combination of) the following features are provided in step S101 and/or S105 and/or S109:

I. the feed 110 which is fed into coalescer 100 is characterized by an average droplet size (i.e. droplets of the first liquid—i.e. the dispersed phase) Average droplet Size(Feed). In some embodiments, for every segment $Seg_i$(i is a positive integer $1 \le i \le N$) of Segment_Set, a ratio between (i) a respective individual segment average width isaw($Seg_i$) and (ii) Average droplet Size (Feed) is at least 3 or at least 4 or at least 5 or at least 10 or at least 15 or at least 20.

II. a flow rate through the channel (or each channel when there are a plurality of channels) is at least 0.5 m$^3$/hour or at least 1 m$^3$/hour or at least 1.5 m$^3$/hour or at least 2 m$^3$/hour or at least 20 m$^3$/hour; III. the multiphase dispersion is forced through the channel so that for every individual segment $Seg_i$, every $b_i$-sized obstacle of b_$i$_Obstacle_Set($Seg_i$) generates a different respective flow separation zone. In some embodiments, the flow separation zones may contact another (e.g. downstream) obstacle, but are distinct from each other. Furthermore, in some embodiments, for at least 50% or at least 60% or at least 70% or at least 80% or at least 90% of obstacles of b_$i$_Obstacle_Set($Seg_i$), a ratio between (i) a width of a flow separation zone formed by the $b_i$-sized obstacle and (ii) an individual-segment average width isaw($Seg_i$) of the segment $Seg_i$ within which the set b_Obstacle_Set($Seg_i$) of $b_i$-sized obstacles is disposed is at least 0.05 or at least 0.1 or at least 0.2.

IV. every individual segment $Seg_i$(i is a positive integer $1 \le i \le N$) of Segment_Set is characterized by a void fraction, which is 1—(Volume of all obstacles within the segment)/(Volume of the segment)—in different embodiments, this void fraction is between 0.5 and 0.9 e.g. at least 0.5 or at least 0.6 or at least 0.7 or at least 0.8 and/or at most 0.8 or at most 0.7. In step S113 output from the coalescer 100 is sent into separator 200, and in step S117 output (e.g. streams 150 and 160) is received from the separator.

Figure 6A:
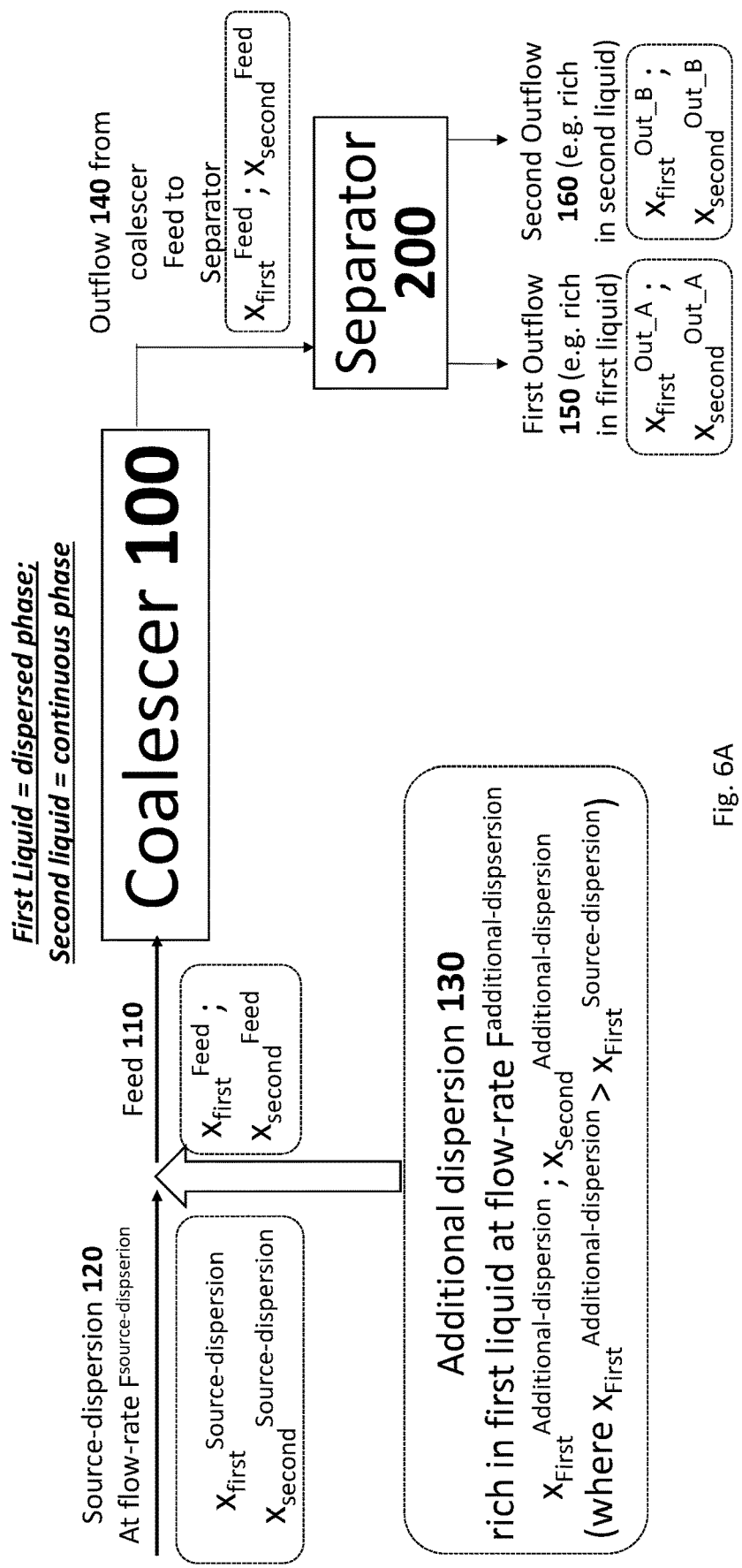
FIGS. 6A-6B describe systems comprising a coalescer and a separator.

FIG. 6A is one particular example of the system of FIG. 1 where the feed 110 is formed by mixing (i) a source-dispersion 120 with (ii) an additional dispersion flow 130 that is 'rich' in the first liquid (i.e. a volume fraction of the first liquid in the additional dispersion 130 exceeds a volume fraction of the first liquid in the source-dispersion 120). In the example of FIG. 6A, a fraction of the first liquid in source-dispersion is less than 20% v/v, and it is desired to raise a concentration of the first liquid so as to obtain a feed 110 having a concentration of the first liquid that is at least 20% v/v. In different embodiments, the source dispersion 120 contains at most 10% v/v or at most 5% v/v or at most 2.5% or at most 1% v/v or at most 0.5% v/v or at most 0.25% v/v or at most 0.1% v/v or at most 0.05% v/v or at most 0.01% v/v of the first liquid.

In the example of FIG. 6A, multiple flows are mixed with each other in particular, a flow rate of source-dispersion 120 is $F^{source}$, and a flow rate of additional-dispersion 130 is $F^{additional\,feed}$. In some embodiments, a volume ratio (i.e. mixing ratio) between the source dispersion 120 and the additional dispersion 130 obeys the following relation.

$$0.2 < (x_{first}^{source\,dispersion} * F^{source} + x_{first}^{additional\,feed} * F^{additional\,feed}) / (F^{source} + F^{additional\,feed}) < 0.495,$$

In one example, $x_{first}^{source\,dispersion} = 0.01$, and $x_{first}^{additional\,feed} = 0.3$. In this example, $F^{additional\,feed} > 1.9 * F^{source}$.

Thus, in different embodiments, at least majority of a flow of the feed into the first segment of the coalescer 100 is provided by additional feed.

Figure 6B:
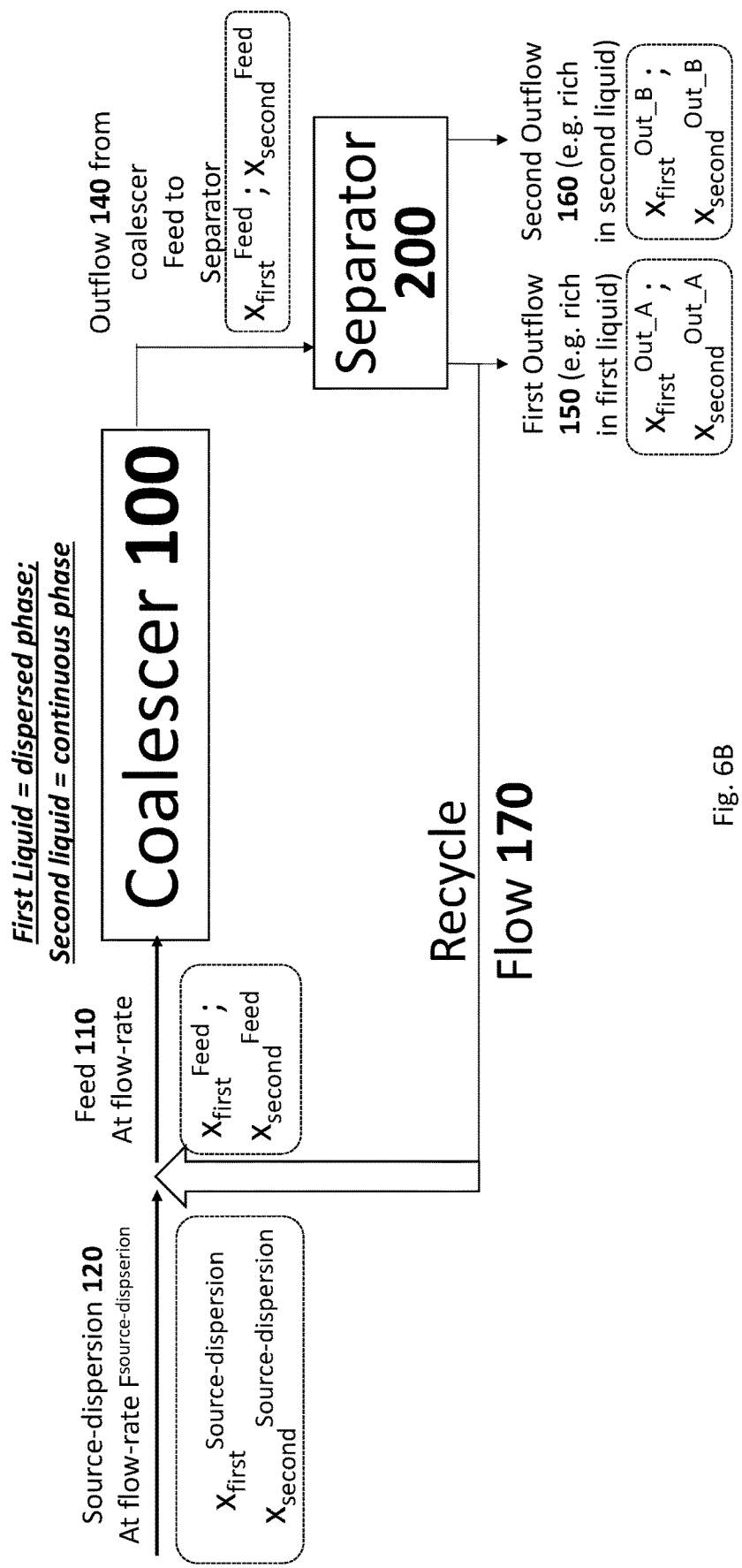

In the example of FIG. 6B, additional dispersion 130 is obtained from an outflow 150 of separator 200. Thus, in some embodiments, at least majority of a flow of the feed 110 into the first segment of the coalescer 100 is provided by an outflow from the separator 200.

Figure 7:
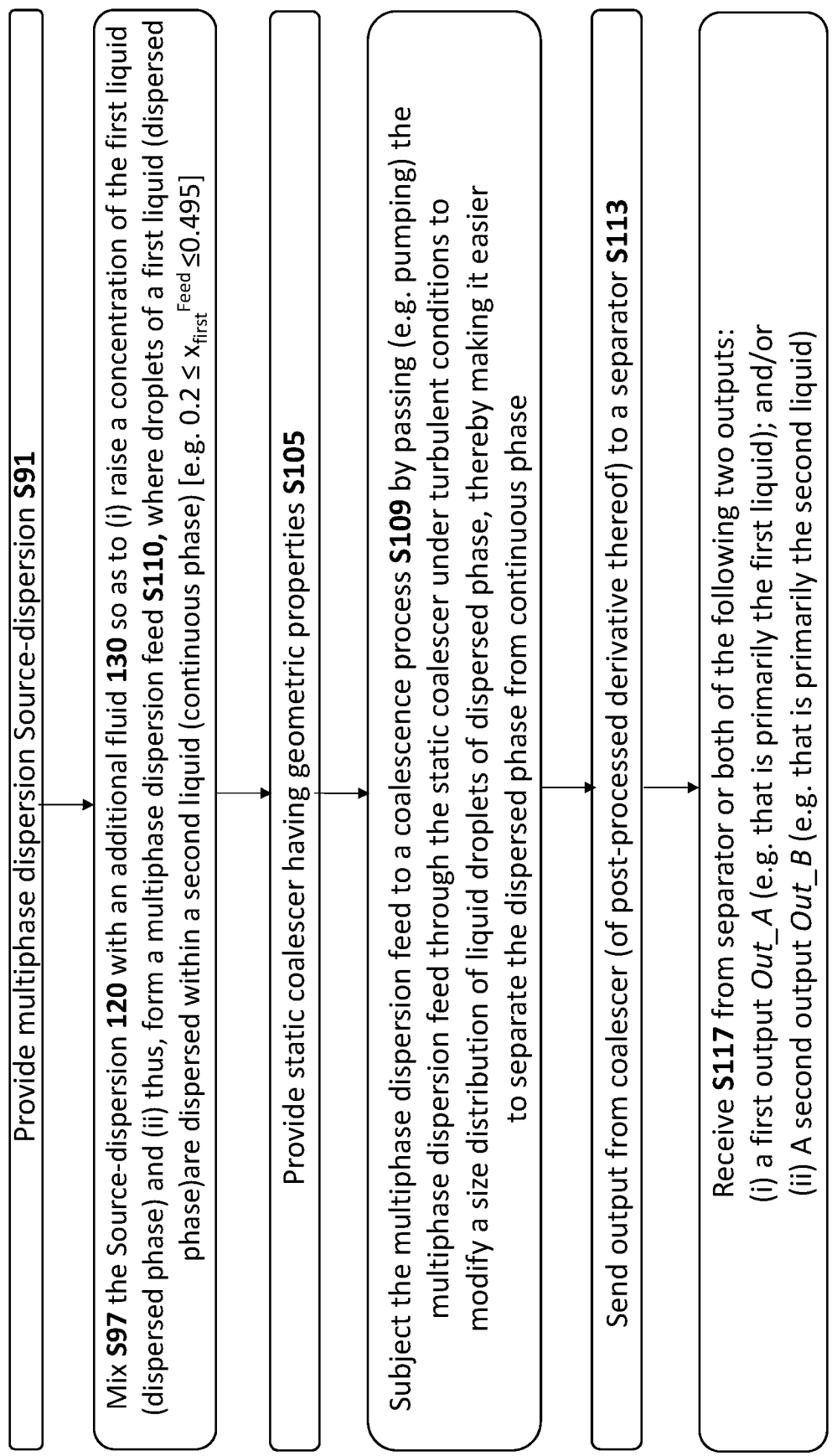

FIG. 7 is a flow-chart of another method including steps S91 and S97.

In the example of FIGS. 2A-2C, the channel is shown as a straight line. This is not a limitation. In the example of FIG. 8, the channel is a winding channel constructed from a number of switchbacks (e.g. at least 5 or at least 10 or at least 25 or at least 50) the number of switchbacks illustrated in FIG. 8 is relatively small, but in different embodiments, the number of switchbacks may be at least 5 or at least 10 or at least 25 or at least 50.

In some embodiments, the switchbacks are useful for providing a relatively 'long' channel within a relatively small region of space. Thus, in some embodiments, an entirety of the channel (i.e. comprising all segments of the segment shape) is within a prism (e.g. rectangular prism) having dimensions of x,y,z and a ratio between a length of the channel and max(x,y,z) is at least 5 or at least 10 or at least 50 or least 100.

In the implementation of FIG. 8, the 'switchbacks' are implemented by a set of parallel flat plates, where the obstacles held by pins.

In the example of FIG. 9, a set of switchbacks (e.g. like in FIG. 8) are disposed in every level, and every level houses a respective channel. In this manner, such channels may be provided in-parallel.

Some embodiments of the present invention relate to a coalescence method comprising: a. providing a multiphase dispersion feed (e.g. an emulsion) comprising dispersed and continuous phases of first and second liquids, the multiphase dispersion feed comprising at least 20% v/v (by volume) first liquid; and b. subjecting the multiphase dispersion feed to a coalescence process by passing it through a static mechanical droplet-coalescer comprising a channel including a set Segment_Set $\{Seg_1, Seg_2 \ Seg_N\}$ of at least 10 or at least 25 or at least 50 or at least 100 or at least 500 in-series segments disposed in series with respect to each other, where each given segment $Seg_i$ being characterized by a segment-specific-characteristic obstacle size $b_i$.

In some embodiments, each given segment $Seg_i$ has each of the following at least one or at least two or at least three or at least four or at least five of at least six or all of the following features 7 features (Features A-G):

Feature A—a ratio between a respective individual-segment length $isl(Seg_i)$ for the given segment $Seg_i$ and an respective individual segment average width $isaw(Seg_i)$ for the given segment $Seg_i$ is at least 5 or at least 10 or at least 25 or at least 50;

Feature B—a ratio between $b_i$ and a respective individual segment average width $isaw(Seg_i)$ for the given segment $Seg_i$ is less than 1 and is at least 0.05 or at least 0.1 or at least 0.2;

Feature C—at least 5 or at least 10 or at least 25 or at least 50 or at least 100 $b_i$-sized obstacles are disposed within every individual segment $Seg_i$ to form a respective set $b_i\_Obstacle\_Set(Seg_i)$ of $b_i$-sized obstacles for the given segment $Seg_i$;

Feature D—flow throughout at least 50% or at least 75% at least 90% or at least 95% or at least 99% or an entirety of each said segment is sufficiently turbulent such that a segment-specific Reynold's number $\rho*IS\_V_{AVG}(Seg_i)*b_i/\mu$ is at least 2000 or at least 3000 or at least 3500 or at least 4000 or at least 4500 or at least 5000 or at least 5500 or at least 6000 where $IS\_V_{AVG}(Seg_i)$ is the respective average velocity within the given segment $IS\_V_{AVG}\ \alpha(Seg_i)*$;

Feature E—each $b_i$-size obstacle of a subset $Sub(b_i\_Obstacle\_Set(Seg_i))$ of set $b_i\_Obstacle\_Set(Seg_i)$ of $b_i$-sized obstacles within the given segment $Seg_i$ is distanced from its nearest neighboring $b_i$-size obstacle within the channel by at least $0.5*b_i$ or $0.6*b_i$ or $0.75*b_i$ or at least $0.85*b_i$ or at least $b_i$ and/or at most $3*b_i$ or at most $2.5*b_i$ or at most $2.25*b_i$ or at most $2*b_i$ (for example, between $0.75*b_i$ and $2.5*b_i$). In different examples, subset $Sub(b_i\_Obstacle\_Set(Seg_i))$ comprises at least 50% of members of $b_i\_Obstacle\_Set(Seg_i)$ or at least 75% of members of $b_i\_Obstacle\_Set(Seg_i)$ or at least 90% of members of $b_i\_Obstacle\_Set(Seg_i)$. In some embodiments, every member of $b_i\_Obstacle\_Set(Seg_i)$ is a member of subset $Sub(b_i\_Obstacle\_Set(Seg_i))$ and a cardinality of subset $Sub(b_i\_Obstacle\_Set(Seg_i))$ is equal to a cardinality of $b_i\_Obstacle\_Set(Seg_i)$; Feature F—a ratio $(IS\_V_{AVG}(Seg_i))^3/b_i$ between (A) a cube of the respective average velocity $IS\_V_{AVG}(Seg_i)$ within the given segment $Seg_i$ and (B) $b_i$ is at least 0.5 meter$^2$/sec$^3$ or at least 0.6 meter$^2$/sec$^3$ or at least 0.7 meter$^2$/sec$^3$ or at least 0.75 meter$^2$/sec$^3$ or at least 0.8 meter$^2$/sec$^3$ or at least 0.9 meter$^2$/sec$^3$ or at least 1 meter$^2$/sec$^3$ and/or at most 20 meters$^2$/sec$^3$ or at most 15 meters$^2$/sec$^3$ or at most 12.5 meters$^2$/sec$^3$ or at most 10 meters$^2$/sec$^3$ (e.g. between 0.75 meter$^2$/sec$^3$ and 15 meters$^2$/sec$^3$), Feature G—the dispersion feed is passed through the static mechanical droplet-coalescer so that the total residence time collectively in all of the segments of Segment_Set $\{Seg_1, Seg_2 \ldots Seg_N\}$ is at least 30 seconds or at least 45 seconds or at least one minute.

In different embodiments, any combination of Feature A and/or Feature B and/or Feature C and/or Feature D and/or Feature E and/or Feature F and/or Feature G may be provided.

In some embodiments, for all of the segments of Segment_Set $\{Seg_1, Seg_2 \ldots Seg_N\}$ have a common $b_i$ value such that $b_1=b_2=\ldots=b_N$. In some embodiments, for each given segment $Seg_i$ of Segment_Set $\{Seg_1, Seg_2 \ldots Seg_N\}$, each $b_i$-size obstacle of the set $b_i\_Obstacle\_Set(Seg_i)$ of $b_i$-sized obstacles within the given segment $Seg_i$ is upstream longitudinally-displaced from another $b_i$-size obstacle by at least $0.5*b_i$ or $0.6*b_i$ or $0.75*b_i$ or at least $0.85*b_i$ or at least $b_i$ and/or at most $3*b_i$ or at most $2.5*b_i$ or at most $2.25*b_i$ or at most $2*b_i$ (for example, between $0.75*b_i$ and $2.5*b_i$).

In some embodiments, for each given segment $Seg_i$ of Segment_Set $\{Seg_1, Seg_2 \ldots Seg_N\}$, each $b_i$-size obstacle of the set $b_i\_Obstacle\_Set(Seg_i)$ of $b_i$-sized obstacles within the given segment $Seg_i$ is downstream longitudinally-displaced from another $b_i$-size obstacle by at least $0.5*b_i$ or $0.6*b_i$ or $0.75*b_i$ or at least $0.85*b_i$ or at least $b_i$ and/or at most $3*b_i$ or at most $2.5*b_i$ or at most $2.25*b_i$ or at most $2*b_i$ (for example, between $0.75*b_i$ and $2.5*b_i$). 4. The method of any preceding claim, further comprising, after the coalescence process, passing the post-static-coalescer dispersion into a separator to obtain separate first and second output phases.

In some embodiments, the first and second output phases respectively comprise the first and second liquids and are respectively substantially free of the second and first liquids.

In some embodiments, the feed is obtained by mixing a source-dispersion with an additional dispersion.

In some embodiments, the additional dispersion is obtained from recycling an outflow of the separator, the outflow having a concentration of the first liquid that is least 20% vol, or at least 25% vol or at least 30% or at least 40%.

In some embodiments, a dispersed phase in the additional feed and a dispersed phase in the source feed are both organic but are different liquids.

In some embodiments, the source feed is a crude oil and the additional feed is a hydrotreated petroleum product and/or jet fuel and/or kerosene and/or diesel and/or gasoline.

In some embodiments, at least 10% or at least 20% or at least 30% or at least 40% or at least 50% of a feed entering the first segment is obtained from an output of the separator.

In some embodiments, a void fraction in each $Seg_i$ segments of Segment_Set $\{Seg_1, Seg_2 \ldots Seg_N\}$ is at least 50% or at least 60% or at least 70% or at least 80% or at least 90%—e.g. between 50% and 90%.

In some embodiments, for each given segment $Seg_i$ of Segment_Set $\{Seg_1, Seg_2 \ldots Seg_N\}$, no point within the given segment $Seg_i$ is longitudinally displaced from a nearest obstacle of the respective set $b_i$_Obstacle_Set($Seg_i$) of $b_i$-sized obstacles by more than $3*b_i$ or by more than $2.5*b_i$ or by more than $2*b_i$ or by more than $1.5*b_i$.

In some embodiments, the coalescence process is performed so as to reduce a population of droplets having a size of less than x microns by at least 5% or at least 10% or at least 25% or at least 50% or at least 75% or at least 80%, and wherein x is selected from the group consisting of 50 microns, 40 microns, 30 microns, 25 microns, 20 microns, 15 microns and 10 microns. In one example, x=50 microns. In another example, x=30 microns. In another example, x=25 microns. In another example, x=20 microns. In another example, x=15 microns. In another example, x=10 microns.

In some embodiments, the coalescence process is performed to increase a population of droplets having a size of at least y by at least 1% or at least 2% or at least 3% or at least 5% or at least 10%, and wherein y is selected from the group consisting of 75 microns, 80 microns, 85 microns, 90 microns, 100 microns, 125 microns, 150 microns and 200 microns. In one example, y=70 microns. In another example, y=80 microns. In another example, y=85 microns. In another example, y=90 microns. In another example, y=100 microns. In another example, y=125 microns. In another example, y=150 microns. In another example, y=200 microns.

In some embodiments, upon entering the first segment of Segment_Set $\{Seg_1, Seg_2 \ldots Seg_N\}$ an average droplet size of the dispersion is avg_in and upon exiting the last segment of Segment_Set $\{Seg_1, Seg_2 \ldots Seg_N\}$ an average droplet size of the dispersion is avg_out, and a ratio avg_out/avg_in is at least 1.01 or at least 1.02 or at least 1.03 or at least 1.04 or at least 1.05 or at least 1.1 or at least 1.25 or at least 1.5 or at least 2.

In some embodiments, an entirety of the channel is within a prism (e.g. rectangular prism) having dimensions of x,y,z and a ratio between a length of the channel and max(x,y,z) is at least 5 or at least 10 or at least 50 or least 100.

In some embodiment, a ratio between (i) an average droplet size of the second multiphase dispersion feed and (ii) the characteristic width w characterizing each of the segments is at most 1 or at most 0.5 or at most 0.25 or at most 0.1 or at most 0.05 or at most 0.01.

In some embodiments, at least a majority of the segments of Segment_Set $\{Seg_1, Seg_2 \ldots Seg_N\}$ (e.g. at least 50% of Segment_Set or at least 75% of segments of Segment_Set or 90% of segments of Segment_Set or all segments of Segment_Set) lacks sharp obstacles having a radius of curvature of at most z mm. In one example, z=6 mm. In one example, z=5 mm. In one example, z=4 mm. In one example, z=3 mm.

In some embodiment, the second multiphase dispersion feed comprises at most 50% V/V first liquid.

In some embodiment, for each segment $Seg_i$ at least some or at least a majority of the $b_i$-obstacles are attached to and/or integrally formed with a channel wall.

In some embodiment, a size of all $b_i$-obstacles is on the same order of magnitude. Thus, in some embodiments, for each given segment $Seg_i$ of Segment_Set $\{Seg_1, Seg_2 \ldots Seg_N\}$ a ratio between (i) a maximum $b_i$ value for the obstacle set $MAX(b_1, b_2, b_N)$ of $b_i$-obstacles within the given segment $Seg_i$ and (ii) a minimum $b_i$ value for the obstacle set $MIN(b_1, b_2, b_N)$ of $b_i$-obstacles within the given segment $Seg_i$ is at most 10 or at most 7.5 or at most 5 or at most 4 or at most 3 or at most 2.5 or at most 2 or at most 1.5 or at most 1.25 and/or at least 1.25 or at least 1.5 or at least 2.

In some embodiment, the segment set $\{Seg_1, Seg_2 \ldots Seg_N\}$ has first and second subsets denoted as seg-FIRST, such that (i) a most downstream segment in the first subset seg-First is disposed upstream of a most upstream segment in the second subset seg-Second, (ii) a minimum $b_i$ value among segments of the first subset is defined as b-FIRST; (iii) a maximum $b_i$ value among segments of the second subset is defined as b-SECOND; and (iv) a ratio between b-FIRST and b-SECOND is at least 1.25 or at least 1.5 or at least 1.75 or at least 2 or at least 3 or at least 5.

In some embodiments, the first subset seg-FIRST has at a cardinality of at least 3 or at least 5 or at least 10 or at least 15 and/or the second subset seg-SECOND has at a cardinality of at least 3 or at least 5 or at least 10 or at least 15.

In some embodiment, the segment set $\{Seg_1, Seg_2 \ldots Seg_N\}$ has first, second and third subsets denoted as seg-First, seg-Second and seg-Third, such that (i) a most downstream segment in the first subset seg-First is disposed upstream of a most upstream segment in the second subset seg-Second, (ii) a most downstream segment in the second subset seg-Second is disposed upstream of a most upstream segment in the third subset seg-Third, (iii) a minimum $b_i$ value among segments of the first subset seg-First is defined as b-MIN-FIRST; (iv) a maximum $b_i$ value among segments of the second subset seg-Second is defined as b-MAX-SECOND; (v) a ratio between b-MIN-FIRST and b-MAX-SECOND is at least 1.25 or at least 1.5 or at least 1.75 or at least 2,(vi) a minimum $b_i$ value among segments of the second subset seg-Second is defined as b-MIN-SECOND; (iv) a maximum $b_i$ value among segments of the third subset seg-Third is defined as b-MAX-THJIRD; (v) a ratio between b-MIN-SECOND and b-MAX-THIRD is at least 1.25 or at least 1.5 or at least 1.75 or at least 2 or at least 3 or at least 5.

In some embodiments, the first subset seg-FIRST has at a cardinality of at least 3 or at least 5 or at least 10 or at least 15 and/or the second subset seg-SECOND has at a cardinality of at least 3 or at least 5 or at least 10 or at least 15 and/or the third subset seg-SECOND has at a cardinality of at least 3 or at least 5 or at least 10 or at least 15.

In one example, the continuous phase (i.e. second liquid) of the dispersion is aqueous and the dispersed phase (i.e. first liquid) is organic (e.g. non-polar). In another example, the continuous phase (i.e. second liquid) of the dispersion is organic (e.g. non-polar) and the dispersed phase (i.e. first liquid) is aqueous.

The present disclosure describes many features of a method and/or system for coalescence. It is stressed that any combination of features, including combinations disclosed explicitly and other combination not explicitly listed (for brevity) are contemplated and may be claimed.

Examples of 'organic' liquids include but are not limited to crude oil, fuel-products (e.g. kerosene, diesel, jet-fuel, gasoline or any other hydrotreated product), vegetable oil, synthetic oil or any other organic liquid.

All references cited herein are incorporated by reference in their entirety. Citation of a reference does not constitute an admission that the reference is prior art.

Having thus described the foregoing exemplary embodiments it will be apparent to those skilled in the art that various equivalents, alterations, modifications, and improvements thereof are possible without departing from the scope and spirit of the claims as hereafter recited. In particular, different embodiments may include combinations of features other than those described herein. Accordingly, the claims are not limited to the foregoing discussion.

What is claimed is:

1. A coalescence method, the method comprising:
   a. providing a multiphase dispersion feed comprising dispersed and continuous phases of first and second liquids, the multiphase dispersion feed comprising at least 20% v/v (by volume) first liquid; and
   b. subjecting the multiphase dispersion feed to a coalescence process by passing it through a static mechanical droplet-coalescer comprising a channel including a set Segment_Set $\{Seg_1, Seg_2 \ldots Seg_N\}$ of at least 10 in-series segments disposed in series with respect to each other, each given segment $Seg_i$ being characterized by a segment-specific-characteristic obstacle size $b_i$, and wherein each given segment $Seg_i$ of set Segment_Set $\{Seg_1, Seg_2 \ldots Seg_N\}$ has each of the following features:
      i. a ratio between a respective individual-segment length $isl(Seg_i)$ for the given segment $Seg_i$ and an respective individual segment average width isaw $(Seg_i)$ for the given segment $Seg_i$ is at least 10;
      ii. a ratio between $b_i$ and a respective individual segment average width $isaw(Seg_i)$ of the given segment $Seg_i$ is at most 0.7 and is at least 0.2;
      iii. at least 10 $b_i$-sized obstacles are disposed within the given segment $Seg_i$ to form a respective set $b\_Obstacle\_Set(Seg_i)$ of $b_i$-sized obstacles for the given segment $Seg_i$;
      iv. flow throughout at least 90% of each said given segment $Seg_i$ is sufficiently turbulent such that a segment-specific Reynold's number $\rho*IS\_V_{AVG}(Seg_i)*b_i/\mu$ is at least 3000 where $IS\_V_{AVG}(Seg_i)$ is the respective average velocity within the given segment ;
      v. each $b_i$-size obstacle of the set $b_i\_Obstacle\_Set(Seg_i)$ of $b_i$-sized obstacles within the given segment $Seg_i$ is distanced from its nearest neighboring $b_i$-size obstacle within the channel by at least $0.75*b_i$, and at most $2.5*b_i$;
      vi. a ratio $(IS\_V_{AVG}(Seg_i))^3/b_i$ between (A) a cube of the respective average velocity $IS\_V_{AGG}(Seg_i)$ within the given segment $Seg_i$ and (B) $b_i$ is between 0.75 meter$^2$/sec$^3$ and 15 meters$^2$/sec$^3$, and wherein the dispersion feed is passed through the static mechanical droplet-coalescer so that a total residence time collectively in all of the segments of Segment_Set $\{Seg_1, Seg_2 \ldots Seg_N\}$ is at least 30 seconds.

2. The method of claim 1 wherein for all of the segments of $\{Seg_1, Seg_2 \ldots Seg_N\}$ have a common $b_i$ value such that $b_1=b_2=\ldots=b_N$.

3. The method of claim 1 wherein for each given segment $Seg_i$ of $\{Seg_1, Seg_2 \ldots Seg_N\}$, each $b_i$-size obstacle of the set $b_i\_Obstacle\_Set(Seg_i)$ of $b_i$-sized obstacles within the given segment $Seg_i$ is upstream longitudinally-displaced from another $b_i$-size obstacle by at least $0.85*b_i$ and at most $3*b_i$.

4. The method of claim 1 wherein for each given segment $Seg_i$ of $\{Seg_1, Seg_2 \ldots Seg_N\}$, each $b_i$-size obstacle of the set $b_i\_Obstacle\_Set(Seg_i)$ of $b_i$-sized obstacles within the given segment $Seg_i$ is downstream longitudinally-displaced from another $b_i$-size obstacle by at least $0.85*b_i$ and at most $3*b_i$.

5. The method of claim 1, wherein the first and second output phases respectively comprise the first and second liquids and are respectively substantially free of the second and first liquids.

6. The method of claim 1 wherein the feed is obtained by mixing a source-dispersion with an additional dispersion.

7. The method of claim 6 wherein the additional dispersion is obtained from recycling an outflow of the separator, the outflow having a concentration of the first liquid that is at least 30%.

8. The method of claim 1 wherein an entirety of the channel is within a rectangular prism (having dimensions of x,y,z and a ratio between a length of the channel and max(x,y,z) is at least 10.

9. The method of claim 1 wherein at least 90% of segments of Segment_Set or all segments of Segment_Set) lacks sharp obstacles having a radius of curvature of at most 5 mm.

10. The method of claim 1 , wherein the segment set $\{Seg_1, Seg_2 \ldots Seg_N\}$ has first and second subsets denoted as seg-First and seg-Second, such that (i) a most downstream segment in the first subset seg-First is disposed upstream of a most upstream segment in the second subset seg-Second, (ii) a minimum $b_i$ value among segments of the first subset is defined as b-FIRST; (iii) a maximum $b_i$ value among segments of the second subset is defined as b-SECOND; and (iv) a ratio between b-SECOND and b-FIRST is at least 1.5, and wherein the first subset seg-First has at a cardinality of at least 15 and the second b-SECOND has at a cardinality of at least 15.

11. The method of claim 1 , wherein the segment set $\{Seg_1, Seg_2 \ldots Seg_N\}$ has first, second and third subsets denoted as seg-First , seg-Second and seg-Third, such that (i) a most downstream segment in the first subset seg-First is disposed upstream of a most upstream segment in the second subset seg-Second, (ii) a most downstream segment in the second subset seg-Second is disposed upstream of a most upstream segment in the third subset seg-Third, (iii) a minimum $b_i$ value among segments of the first subset seg-First is defined as b-MIN-FIRST; (iv) a maximum $b_i$ value among segments of the second subset seg-Second is defined as b-MAX-SECOND; (v) a ratio between b-MIN-SECOND and b-MAX-FIRST is at least 1.5, (vi) a minimum $b_i$ value among segments of the second subset seg-Second is defined as b-MIN-SECOND; (iv) a maximum $b_i$ value among segments of the third subset seg-Third is defined as b-MAX-THJIRD; (v) a ratio between b-MIN-THIRD and b-MAX-SECOND is at least 1.5.

12. A coalescence system comprising:
   a. a static mechanical droplet-coalescer comprising a channel including a set $\{Seg_1, Seg_2 \ldots Seg_N\}$ of at least 10 in-series segments disposed in series with respect to each other; and
   b. a multiphase dispersion comprising dispersed and continuous phases of first and second liquids flowing through the static mechanical droplet-coalescer and through all segments of Segment_Set such that upon entering the first segment $Seg_1$ of set $\{Seg_1, Seg_2 \ldots$ Seg$_N$} the multiphase dispersion comprises at least 20% v/v (by volume) first liquid, wherein each given segment Seg$_i$ is characterized by a segment-specific-characteristic obstacle size b$_i$, and wherein each given segment Segi has each of the following features:

i. a ratio between a respective individual-segment length isl(Seg$_i$) for the given segment Seg$_i$ and an respective individual segment average width isaw(Seg$_i$) for the given segment Seg$_i$ is at least 10;

ii. a ratio between b$_i$ and a respective individual segment average width thereof isaw(Seg$_i$) for the given segment Seg$_i$ at most 0.7 and is at least 0.2;

iii. at least 10 b$_i$-sized obstacles are disposed within every individual segment Seg$_i$ to form a respective set b_Obstacle_Set(Seg$_i$) of b$_i$-sized obstacles for the given segment Seg$_i$;

iv. flow throughout at least 90% of said given Seg$_i$ segment is sufficiently turbulent such that a segment-specific Reynold's number $\rho$*IS V$_{AVG}$ (Seg$_i$)*b$_i$/$\mu$ is at least 3000 where IS_V$_{AVG}$ (Seg$_i$) is the respective average velocity within the given segment;

v. each b$_i$-size obstacle of the set b$_i$_Obstacle_Set(Seg$_i$) of b$_i$-sized obstacles within the given segment Seg$_i$ is distanced from its nearest neighboring b$_i$-size obstacle within the channel by at least 0.75*b$_i$ and at most 2.5*b$_i$;

vi. a ratio (IS_V$_{AVG}$ (Seg$_i$)$^3$/b$_i$ between (A) a cube of the respective average velocity IS_V$_{AVG}$ (Seg$_i$) within the given segment Seg$_i$ and (B) b$_i$ is between 0.75 meter$^2$/sec$^3$ and 15 meters$^2$/sec$^3$, and wherein the multi-phase dispersion is passed through the static mechanical droplet-coalescer so that a total residence time collectively in all of the segments of {Seg$_1$, Seg$_2$ . . . Seg$_N$} is at least 30 seconds.

13. The system of claim 12 further comprising a fluid-flow device for forcing the multi-phase dispersion to flow through the static mechanical droplet-coalescer.

14. The system of claim 13 wherein the fluid-flow device is a pump.

15. The system of claim 12 further comprising a separator disposed downstream of the static coalescer and configured to receive outflow of the coalescer into the separator.

16. The system of claim 15 wherein the separator is a centrifuge assembly, or an electrostatic separator, or hydrocyclone or a settler.

* * * * *